United States Patent [19]

Mizzi et al.

[11] Patent Number: 6,069,420

[45] Date of Patent: May 30, 2000

[54] SPECIALIZED ACTUATORS DRIVEN BY OSCILLATORY TRANSDUCERS

[75] Inventors: John V. Mizzi, Poughkeepsie, N.Y.;
Bruce M. Smackey, Bethlehem, Pa.;
Edward K. Woo, Poughkeepsie, N.Y.

[73] Assignee: Omnific International, Ltd., Poughkeepsie, N.Y.

[21] Appl. No.: 09/296,158

[22] Filed: Apr. 21, 1999

Related U.S. Application Data

[63] Continuation-in-part of application No. 08/735,713, Oct. 23, 1996, Pat. No. 5,770,913.
[60] Provisional application No. 60/082,814, Apr. 23, 1998, and provisional application No. 60/098,115, Aug. 27, 1998.

[51] Int. Cl.[7] .......................... H02K 7/00; H02K 33/00; H01L 41/08; F16H 31/00; G02B 7/182
[52] U.S. Cl. .................. 310/40 MM; 310/15; 310/328; 74/111; 74/126; 359/877
[58] Field of Search ................. 310/15, 20, 46, 310/68 R, 80, 309, 323, 328, 40 MM; 74/111, 126, 130, 131, 132, 133, 135, 136, 163, 164, 165, 166, 168; 359/844, 877; 49/334; 187/315; 72/419, 422; 352/199; 901/1

[56] References Cited

U.S. PATENT DOCUMENTS

| | | | |
|---|---|---|---|
| 479,297 | 7/1892 | McCarthy | 74/165 |
| 2,385,457 | 9/1945 | Morgan | 74/132 |
| 2,488,490 | 11/1949 | Buchmiller | 74/165 |
| 2,594,499 | 4/1952 | Rumph | 74/132 |
| 3,602,286 | 8/1971 | Hachtel | 160/344 |
| 3,767,084 | 10/1973 | Bayha | 198/200 BA |
| 4,062,219 | 12/1977 | Chuparov et al. | 72/422 |
| 4,186,524 | 2/1980 | Pelchat | 49/324 |
| 4,782,262 | 11/1988 | Kiya-Oka | 310/323 |
| 4,906,089 | 3/1990 | Biondi et al. | 248/481 |
| 4,993,822 | 2/1991 | Mittelhauser | 359/877 |
| 5,079,471 | 1/1992 | Nygren, Jr. | 310/328 |
| 5,087,851 | 2/1992 | Nakazawa et al. | 310/323 |
| 5,113,117 | 5/1992 | Brooks et al. | 310/328 |
| 5,136,201 | 8/1992 | Culp | 310/328 |
| 5,315,202 | 5/1994 | LaSota | 310/20 |
| 5,523,643 | 6/1996 | Fujimura et al. | 310/328 |
| 5,631,514 | 5/1997 | Garcia et al. | 310/309 |
| 5,640,063 | 6/1997 | Zumeris et al. | 310/328 |
| 5,780,956 | 7/1998 | Oliver et al. | 310/328 |
| 5,780,957 | 7/1998 | Oliver et al. | 310/328 |

OTHER PUBLICATIONS

Bar–Cohen et al., Low–mass muscle actuators using electroactive polymers (EAP), Proceedings of SPIE's 5th Annual International Symposium on Smart Structures and Materials, pp. 1–2, 5–6, Mar. 1998.

*Primary Examiner*—Clayton LaBalle
*Attorney, Agent, or Firm*—Alfred M. Walker

[57] ABSTRACT

Actuators for power driven accessories for moving objects, such as vehicle power windows, windshield wipers, vehicle power antennas, power side view mirrors, catheter drivers, curtain moving machines, bi-directional rotary motors, thruster mechanisms that move relative to a reaction surface or that drive a driven member relative to itself, use orthogonal oscillatory transducers cooperatively to drive intermediary elements to move these objects bi-directionally along constrained paths. The actuators may also power a pneumatically driven autonomous robot element using dual pneumatic DSES elements such as planar contact surfaces with an array of apertures which are cyclically switched form a source of compressed air which acts as a lubricant to greatly reduce surface friction to a vacuum source, which acts as a clamping medium increasing contact frictional force. Orthogonal bladders are cyclically pressurized or vented to move a central block relative to a surrounding frame. All cyclic activity is oscillated at the same frequency. Coordination of phase differences relative to the DSES cycles determines the path of the robotic element which can vector anywhere on a smooth planar surface.

39 Claims, 28 Drawing Sheets

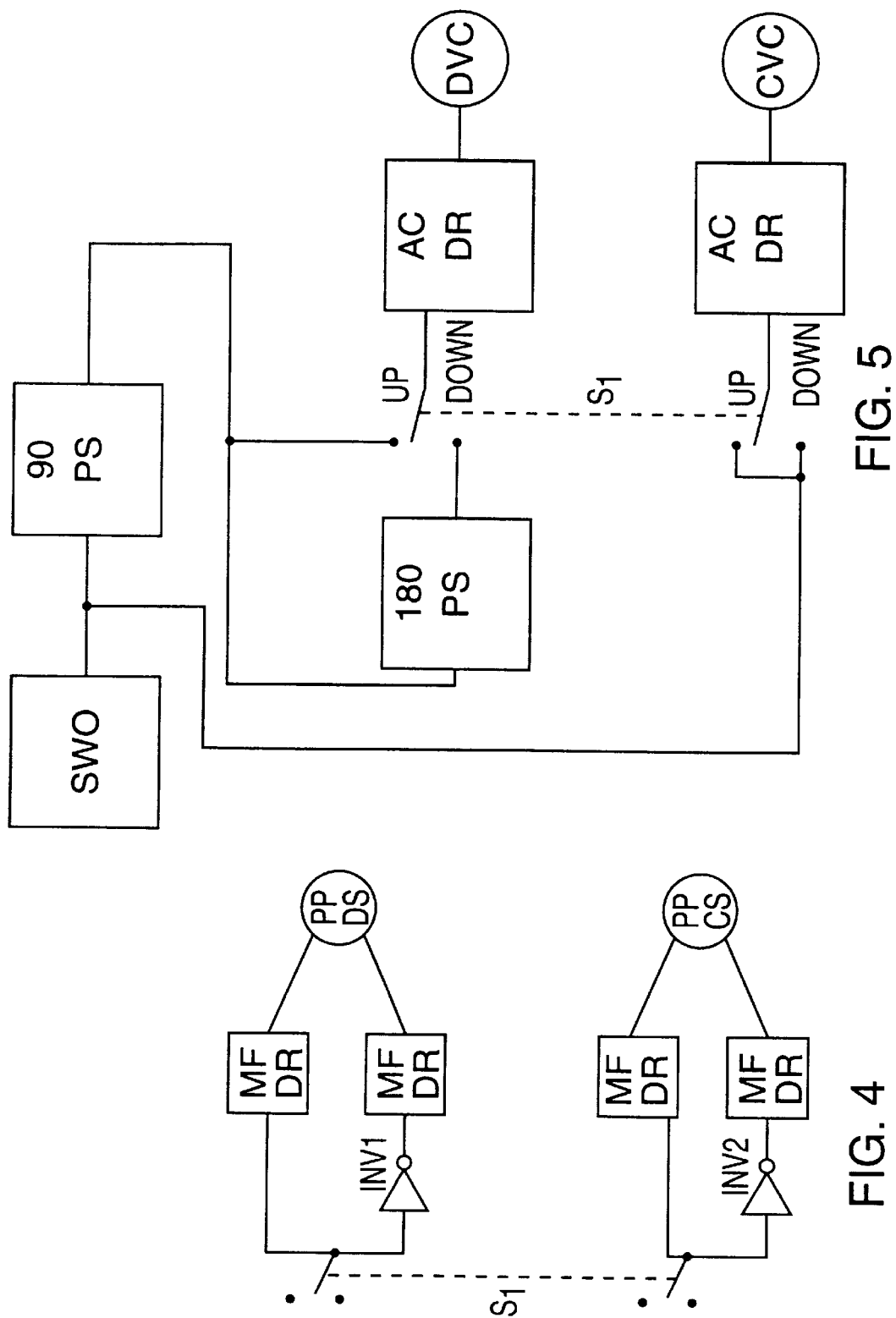

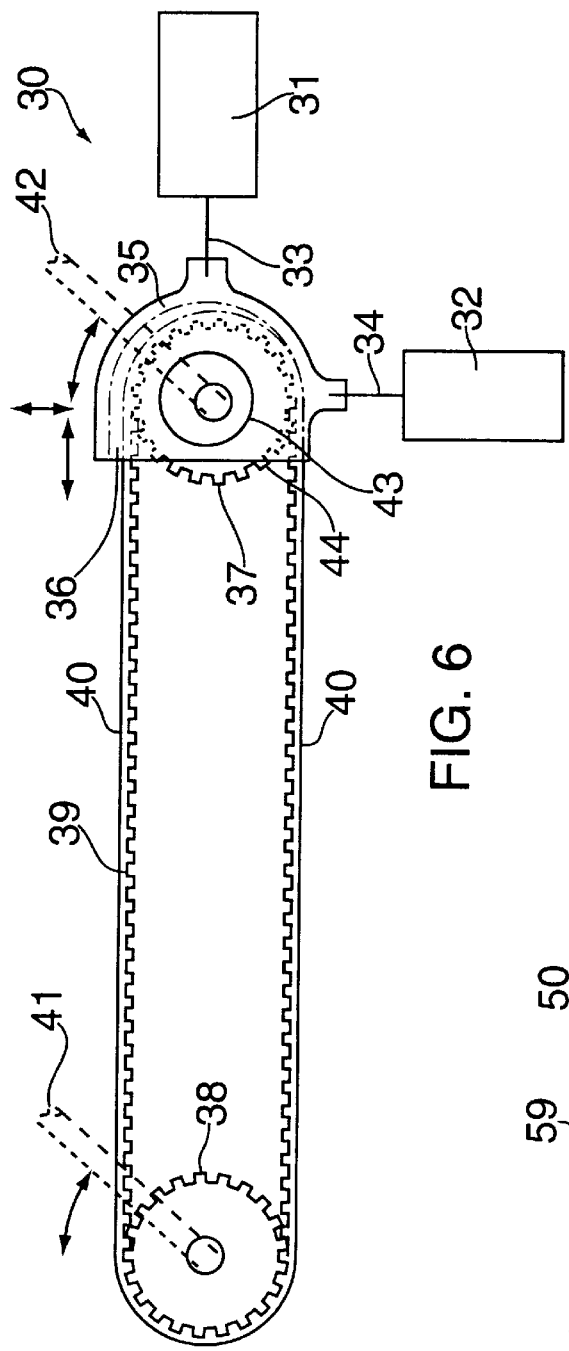
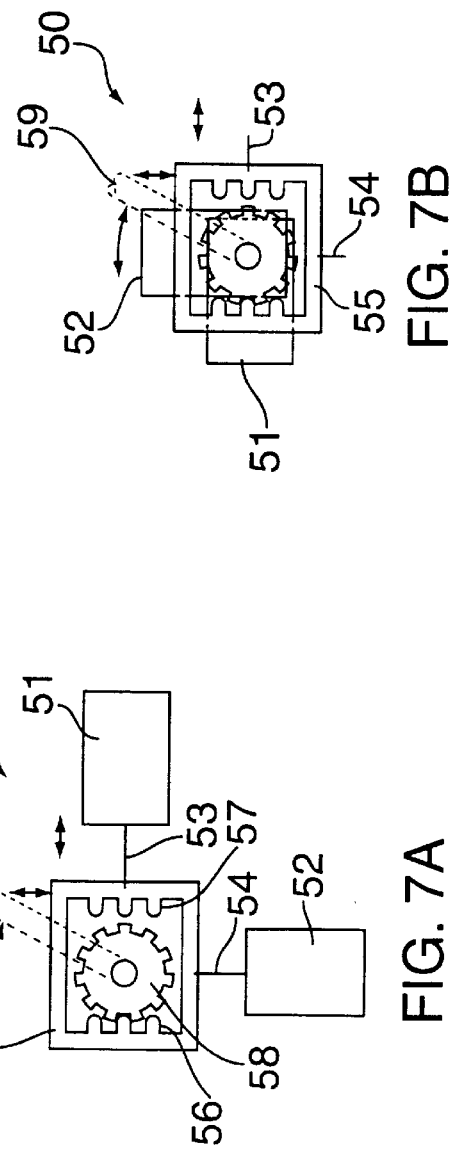
FIG. 6
FIG. 7A
FIG. 7B

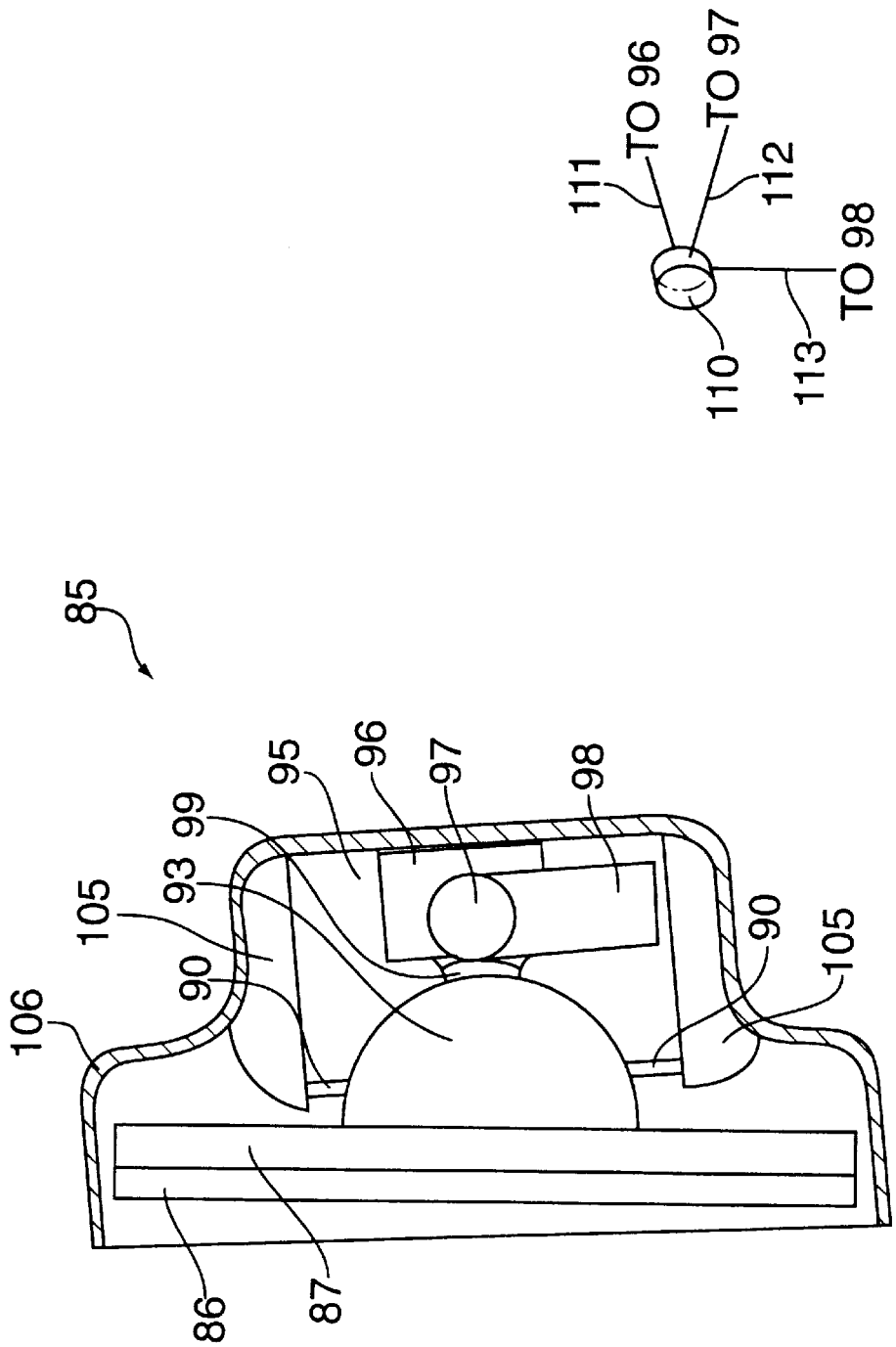

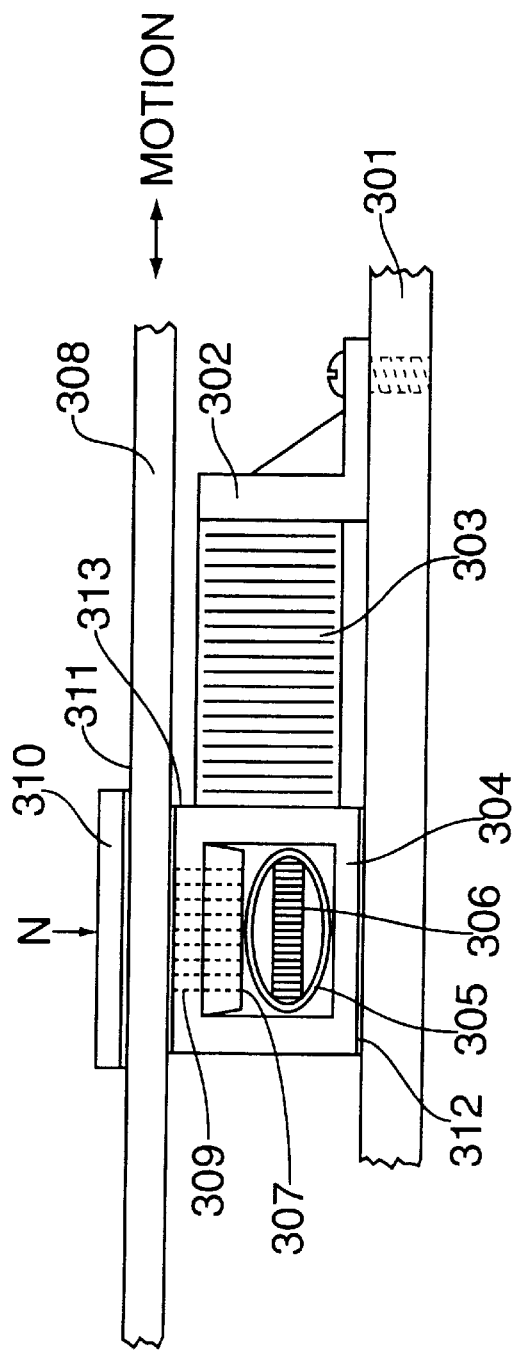
FIG. 25
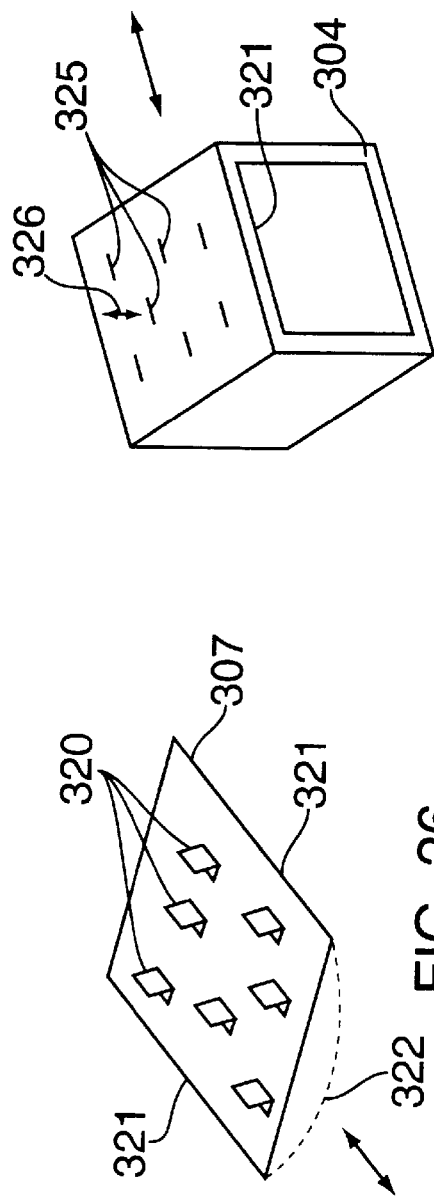
FIG. 27
FIG. 26

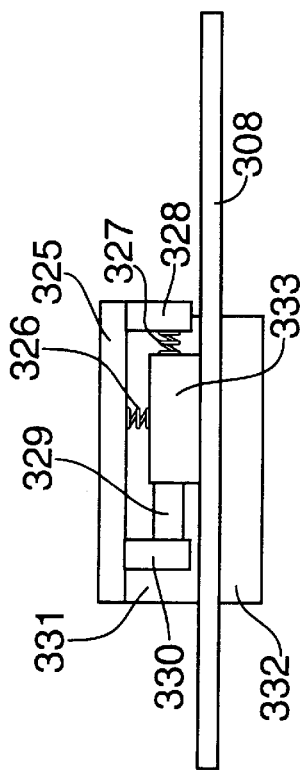
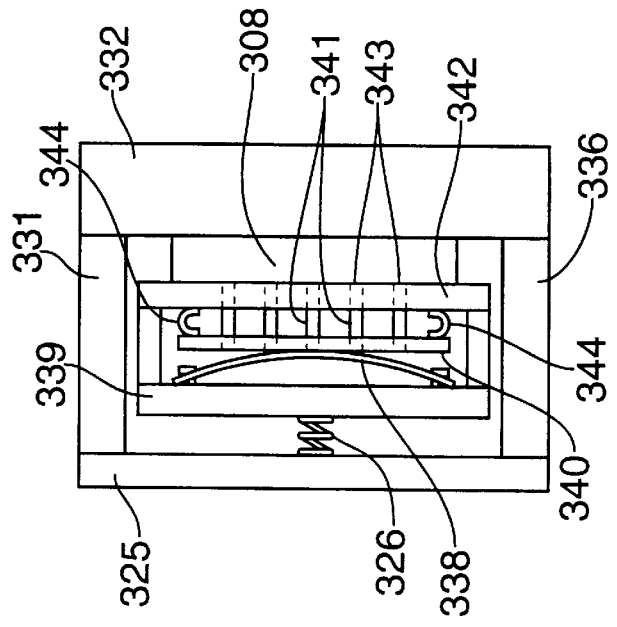
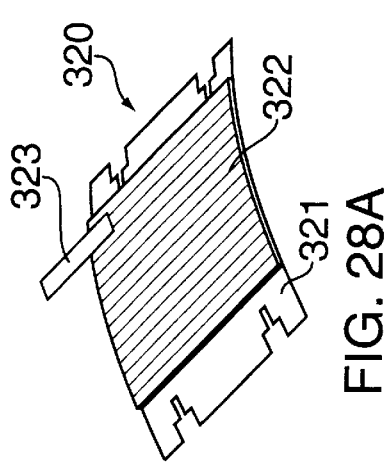
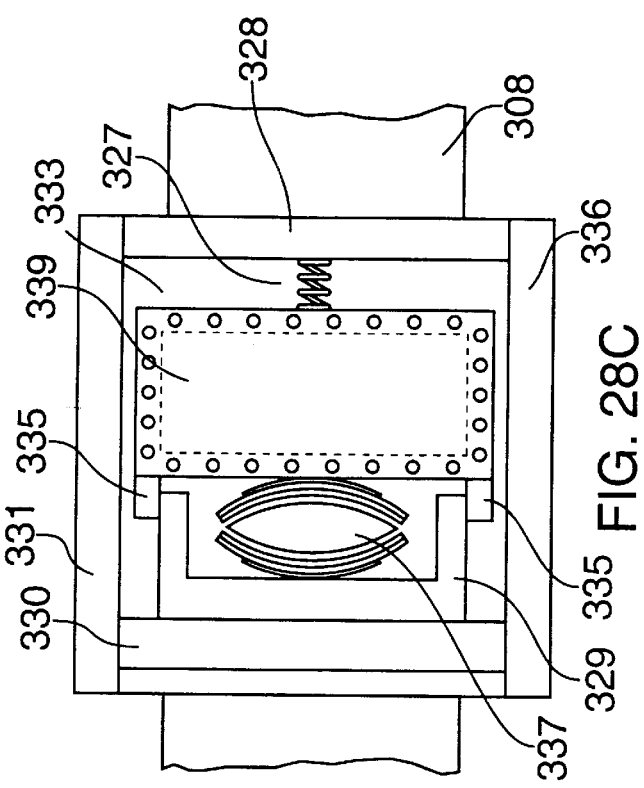

SPECIALIZED ACTUATORS DRIVEN BY OSCILLATORY TRANSDUCERS

RELATED APPLICATIONS

This application is related to provisional application 60/082,814 filed Apr. 23, 1998 which was a continuation in part (CIP) of application Ser. No. 08/735,713 filed Oct. 23, 1996 entitled "Actuators, Motors and Wheelless Autonomous Robots Using Vibratory Transducer Drivers"; this latter application issued as U.S. Pat. No. 5,770,913. This application is also related to provisional application 60/098,115 filed Aug. 27, 1998 which was a continuation in part of provisional application 60/082,814.

FIELD OF THE INVENTION

The present invention relates to actuators for power driven accessories for products, such as motor vehicles.

REFERENCE

Y. Bar-Cohen, T. Xue, M. Shahinpoor, J. O. Simpson, and J. Smith Jet Propulsion Laboratory (JPL), Caltech., Pasadena, Calif., "Low-mass muscle actuators using electroactive polymers (EAP)", Proceedings of SPIE's 5th Annual International Symposium on Smart Structures and Materials, Mar. 1–5, 1998, San Diego, Calif. Paper No. 3324–32

BACKGROUND OF THE INVENTION

Automobile accessories such as power windows, sun roofs, windshield wipers, power antennas, and power side view mirrors are typically driven by brush-type permanent magnet gear motors. These are applications where the average consumer is only aware of the external function of the feature and only becomes peripherally introduced to the technology involved when the accessory fails and must be replaced or repaired at substantial cost. Manufacturers must bear the first cost of the feature as well as any repair activity during warranty periods. Some attempts at reducing first costs have resulted in offsetting increases in warranty service. An unreliable design, or one with limited life or high life-cycle feature cost, impacts the manufacturer even if it survives a warranty period through negative publicity as reflected by widely available "frequency of repair" or "cost of ownership" statistics. External pressures on the automotive industry to reduce greenhouse gas emissions and improve safety have placed new constraints on vehicle design emphasizing lower overall weight and higher efficiency as well as smaller size or more design flexibility of accessory drive packages to make them more conformable to spaces increasingly dictated by these concerns. Design improvements that would reduce cost, improve reliability, reduce weight and size, and/or improve energy efficiency of power driven automotive accessories should be welcome in this environment.

A wide range of electrically powered transducers are utilized to drive specialized actuators for automotive applications in this invention. These include electromagnetic, shape memory alloys as well as piezoelectric transducers. A general purpose piezoelectric thruster is described which operates at frequencies extending to the ultrasonic range. Designs of very long-stroke curvilinear actuators, such as curtain handling machines, are also presented. An ergonomic catheter driver as well as a pneumatically driven autonomous robot element are also detailed.

OBJECTS OF THE INVENTION

It is an object of this invention to use oscillatory transducers as drive elements for motor vehicle accessories.

It is another object of this invention to use power electronics to facilitate the mechanical simplification of motor vehicle accessories.

It is also an object of this invention to segregate heavy power wiring from control wiring and to permit the use of low current switches to control heavy power accessories.

It is a further object of this invention to provide an improved power window regulator.

It is a further object of this invention to provide an improved drive mechanism for sun roofs.

It is another object of this invention to provide an improved power antenna drive mechanism with manual operation in case of failure.

It is still another object of this invention to provide a windshield wiper drive package that eliminates the need for rigid linkages between the two wipers.

It is a further object of this invention to provide windshield wipers with separate drivers which are electronically synchronized and require no mechanical linkage.

It is yet another object of this invention to provide an improved power side view mirror mechanism and drive electronics.

It is an object of this invention to describe a transitional technology for vehicle window regulators using a gear motor with dual drive tapes.

It is another object of this invention to illustrate use of a rotary solenoid in an orthogonal transducer actuator.

It is also an object of this invention to describe the use of a bi-directional single linear transducer actuator.

It is yet another object of this invention to illustrate the use of a single rotary transducer in a window regulator.

It is an object of this invention to show an apparatus for improved friction coupling in a window regulator actuator.

It is also an object of this invention to illustrate a molded version of the improved frictional structure.

It is yet another object of this invention to describe the use of shape memory alloys for vehicle side view mirror applications.

It is an object of this invention to describe the use of long-stroke piezoelectric transducers in actuators.

It is another object of this invention to describe the method of Dynamic System Engagement Switch (DSES) techniques to permit the direct use of ultrasonic transducers with very short strokes.

It is also an object of this invention to illustrate the construction of a piezoelectric thruster using a DSES.

It is yet another object of this invention to describe a manufacturing method for producing a DSES.

It is an object of this invention to describe the construction of a curtain machine using a single long-stroke oscillatory transducer.

It is also an object of this invention to describe a curtain machine using dual piezoelectric thrusters.

It is yet another object of this invention to disclose an ergonomic catheter driver.

It is another object of this invention to illustrate the construction of a pneumatic autonomous robot element using a pneumatic DSES.

SUMMARY OF THE INVENTION

In keeping with these objects and others which may become apparent, the present invention is an actuator using orthogonal oscillatory transducers to cooperatively drive intermediate elements for moving objects, such as automobile power driven accessories, bi-directionally along constrained paths.

The oscillatory transducers that can be used for these applications vary greatly, and the ideal transducer may yet be developed or may be a modified version of the ones to be mentioned. Often the basic geometric configurations of the various applications are generally unaffected by the choice of these transducer types. Candidate transducers include piezoelectric stacks or bimorphs, voice coil electro-magnetic actuators, two-coil push-pull solenoids, and pull solenoids with return springs. The list may also include electro-thermally powered actuators such as NiTi wire elements and thermo-chemically activated motion (TCAM tm) devices, however the difficulty of providing rapid cooling of these latter devices would relegates them to very low frequency operation. Engine vacuum driven devices or oscillatory transducers using compressed air (as found on brake systems of large trucks and busses) are also possibilities for vehicle applications with simple electrical interfaces provided by 3-way solenoid valves. The frequency of operation can vary from subsonic to ultrasonic depending on the response time of the particular transducer. Stroke length of transducer output is a function of the desired output speed and the frequency of operation. Long stroke transducers of non-traditional design are becoming available; examples are the electrostatically driven electroactive polymers (EAP) currently being researched at Caltech's JPL laboratories or the piezoelectric THUNDER® devices available from FACE International Corporation of Norfolk, Va. These latter technologies can also be used for very short strokes at ultrasonic frequencies; ultrasonic thruster configurations are discussed.

Demonstration models of a power window, a windshield wiper mechanism, and a power antenna use pull solenoids with return springs as the transducer of choice. These are off-the-shelf units which are inexpensive and readily available. To compensate for their slow response time, a subsonic frequency has been used to drive them. The drive system described for these demo models is quite simple and not optimized for efficiency. More sophisticated drive electronics using shaped pulses or pulse width modulation (PWM), as is common in the art, can be utilized to boost efficiency and to reduce transducer heating.

A quick overview of the scope of this invention can be gleaned from the species chart of FIG. 14 which lays out a variety of vehicle window regulator mechanisms. The "conventional" path tabulates the three main prior art configurations which are based on the use of DC gear motors. The "new tech" path deals with the subject matter of this invention. Similar charts can be made for the windshield wiper actuators and the side view mirrors. The use of non-perforated dual push-pull drive tapes is an innovation of this invention. If the auto industry is to migrate to the use of oscillatory transducers, it may take some time before the ideal transducer is designed, qualified, and ready for production. In the meantime, the dual drive tape configuration can be designed and qualified on a shorter time frame yielding some early benefits by using it with the tried-and-true gear motor. This invention also deals with improved frictional force transfer and with the use of a rotary solenoid. Single transducer solutions using oriented fibers are also explored. While the electro-thermal solutions may not be practical for the window application for reasons yet to be explored, they are detailed for the side view mirror application in this invention. Both types of piezoelectric solutions, long stroke and ultrasonic thruster, may be practical for the window regulator application. This invention describes their use for this window application as well as others.

The techniques of this invention are also applied to the construction of two different types of curtain machines. These machines are used to open and close curtains for theaters, for window shading, or patient isolation in hospital environments. Cable machines have been traditionally used. In recent years, two other types have been introduced. One high quality version uses a linear electric motor imbedded in the track. While the performance is excellent, the cost of the track and of the electronic driver is quite high. A second version using a powered curtain puller that rides on the track uses a DC gear motor. This lacks some of the performance features of the linear motor and has its own cost/performance limitations. The apparatus of this invention offers two new alternatives that should approach the performance of the linear motor design but at much lower cost.

A general purpose bi-directional rotary motor using oriented fiber elements is described.

A novel design for an ergonomic drive mechanism using a dual-motion electro-magnetic oscillatory transducer is described in this invention.

Finally, a pneumatic autonomous robot element using cyclic air bearing/vacuum clutch techniques for motion is detailed in this invention.

BRIEF DESCRIPTION OF THE DRAWINGS

The present invention can best be understood in connection with the accompanying drawings, in which:

FIG. 4 is a circuit modification for push-pull solenoids;

FIG. 5 is a block diagram for voice coil transducers;

FIG. 6 is a front elevation of timing belt windshield wiper mechanism;

FIGS. 7A and 7B are front views of a "Syncro" type windshield wiper mechanism, wherein:

FIG. 7A is a concept drawing and,

FIG. 7B is a stacked configuration;

FIG. 11 is a side view of a power side view mirror;

FIG. 12 is a detail of flexible linkages for a power mirror;

FIGS. 19A, 19B, 19C and 19D are end views of an improved frictional coupling mechanism, wherein:

FIG. 19A shows the previous embodiment apparatus,

FIG. 19B is a force diagram detail of previous embodiment,

FIG. 19C shows the improved apparatus of this invention, and,

FIG. 19D is a force diagram detail of improved apparatus;

FIG. 25 is a side view of a piezoelectric thruster;

FIG. 26 is a perspective view of a surface engagement plate;

FIG. 27 is a perspective view of a DSES housing;

FIGS. 28A, 28B, 28C and 28D show various views of a bending piezoelectric element used in a thruster design, wherein:

FIG. 28A shows a THUNDER® piezoelectric element;

FIG. 28B shows a side elevation of a thruster with the front panel removed;

FIG. 28C shows a top elevation with the top panel removed;

FIG. 28D shows an end view of a thruster;

FIGS. 29A, 29B, 29C, 29D, 29E, 29F and 29G show various views of curtain machine components wherein:

FIG. 29A is a top view of a curved track;

FIG. 29B is a top view detail;

FIG. 29C is an end view cross section of a track with internal components;

FIG. 29D is a front elevation of an orientation strip;

FIG. 29E is a back elevation of an oscillatory belt;

FIG. 29F is a top view detail showing alignment adjustment on an end pulley;

FIG. 29G is a top view of curtain machine using EAP or shape memory drive elements;

DETAILED DESCRIPTION OF THE INVENTION

Figure 1:
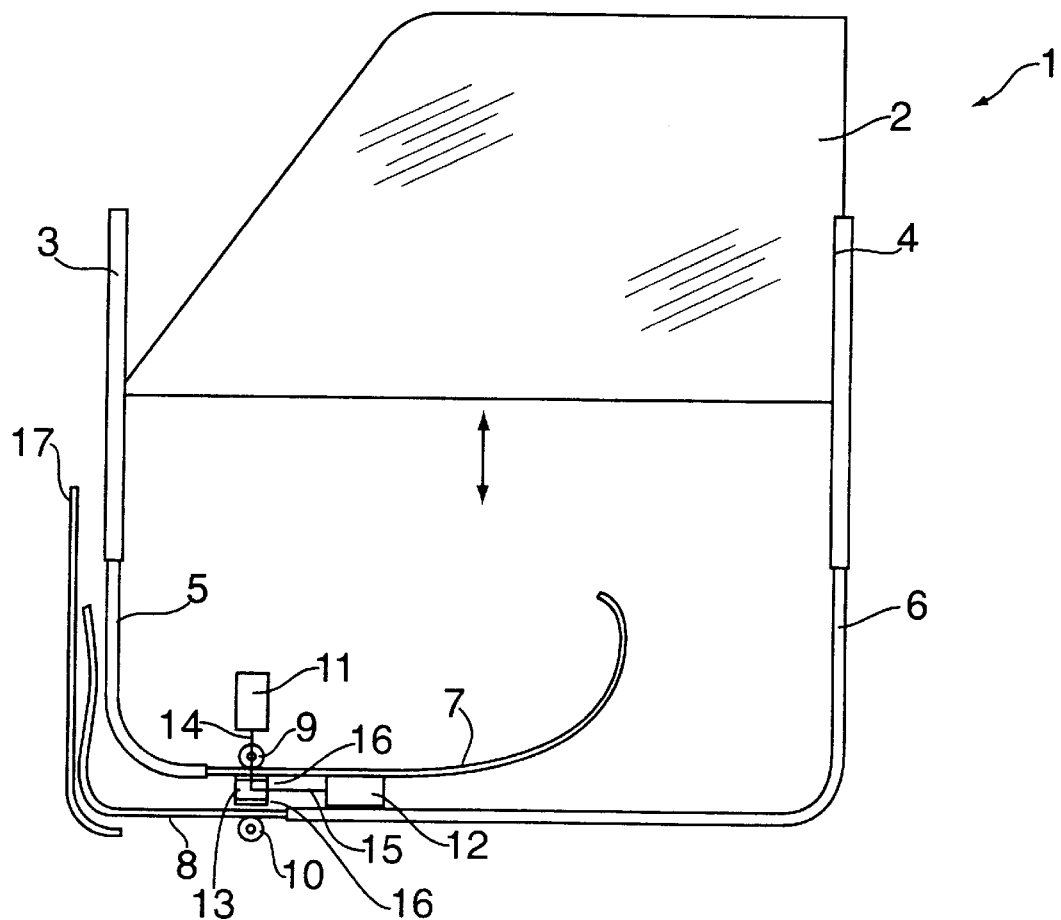
FIG. 1 is a front elevation of a power window driven by an actuator of the present invention.

FIG. 1 shows a power window 1 with glazing 2 and window channels 3 and 4. This is a novel mechanism operated by two tapes 7 and 8 which are driven by two orthogonal oscillatory transducers 11 and 12 instead of the normal DC PM gear motor. The tapes are guided in rigid guides 5 and 6 from the drive block 16 to the base of the glazing 2. The actual forces from the transducers are transmitted by elastomeric friction pads 16 acting cyclically on tapes 7 and 8 with reactive force provided by free rollers 9 and 10. Transducer 11 is the contact transducer and alternately pulls block 16 against tape 7 or pushes it against tape 8 through leaf spring coupling element 14. Transducer 12 is the drive element which pushes or pulls tape 7 or 8 depending on the contact position of block 16 at the time of the stroke. It can be appreciated that UP/DOWN directional movement of window 2 can be selected by the relative phase relationship of the movements of transducers 11 and 12. Transducer 12 is attached to block 16 by leaf spring 15. Drive elements 14 and 15 can transmit substantial push and pull forces while having little resistance to minor excursions perpendicular to these directions. Fixed baffle 17 is just a guide to direct the loose tail of drive tape 8 when the window pane 2 is in the lower regions. The operation of this mechanism is double-acting in that both stroke directions of transducer 12 are used to propel window pane 2 up or down in short (imperceptible) strokes alternating between the left and right sides keeping it essentially horizontal at all times. As shown in FIG. 1, the regulator mechanism need not be centrally located; in fact, great location flexibility is afforded by the dual tape drive concept. This may be of interest if side impact air bags occupy some of the central door cavity space. The planar design of the regulator using a pair of transducers of smaller diameter than the motor they replace makes the design compatible with shallower door panels.

Figure 2:
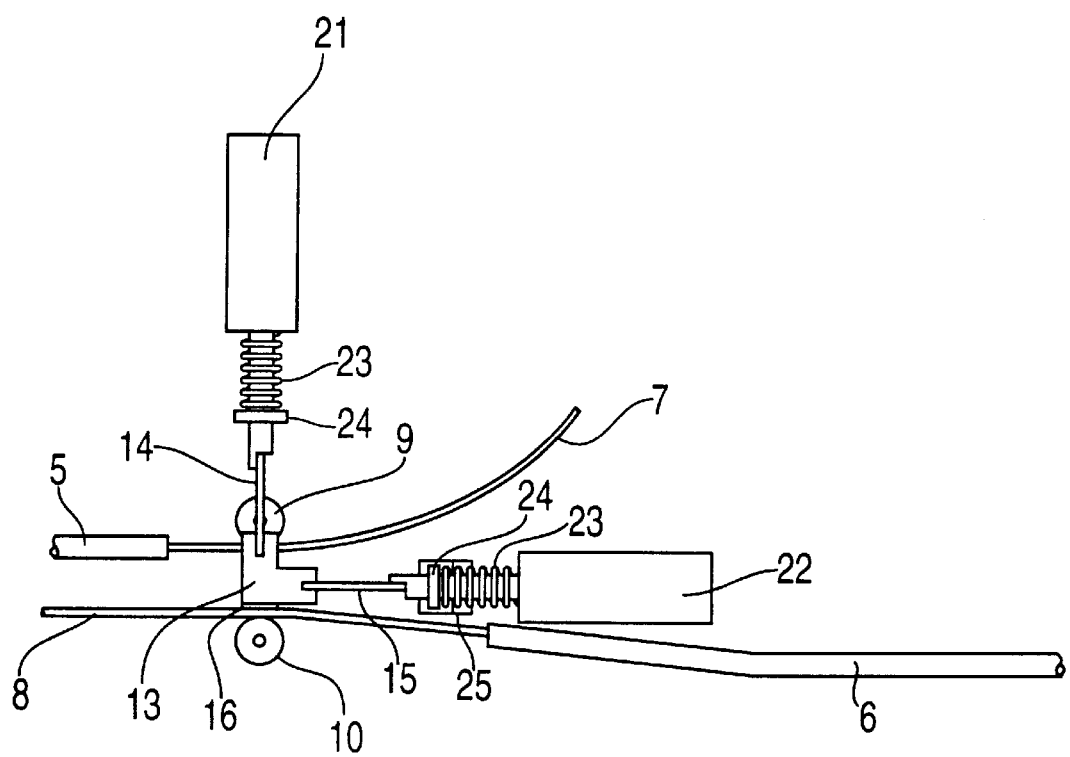
FIG. 2 is a front detail of window regulator driven by an actuator of the present invention.

FIG. 2 is a detail of a window regulator using a pair of pull type solenoids 21 and 22 with return springs 23 acting on spring flanges 24. A limit plate engages flange 24 on solenoid 22 to limit travel in the drive directions to the desired stroke. For the demo system, the drive tapes 7 and 8 are sections of 300 ohm TV antenna twin lead; although its wear characteristics and temperature behavior are probably far from ideal, the degree of flexibility at room temperature is about right.

Figure 3:
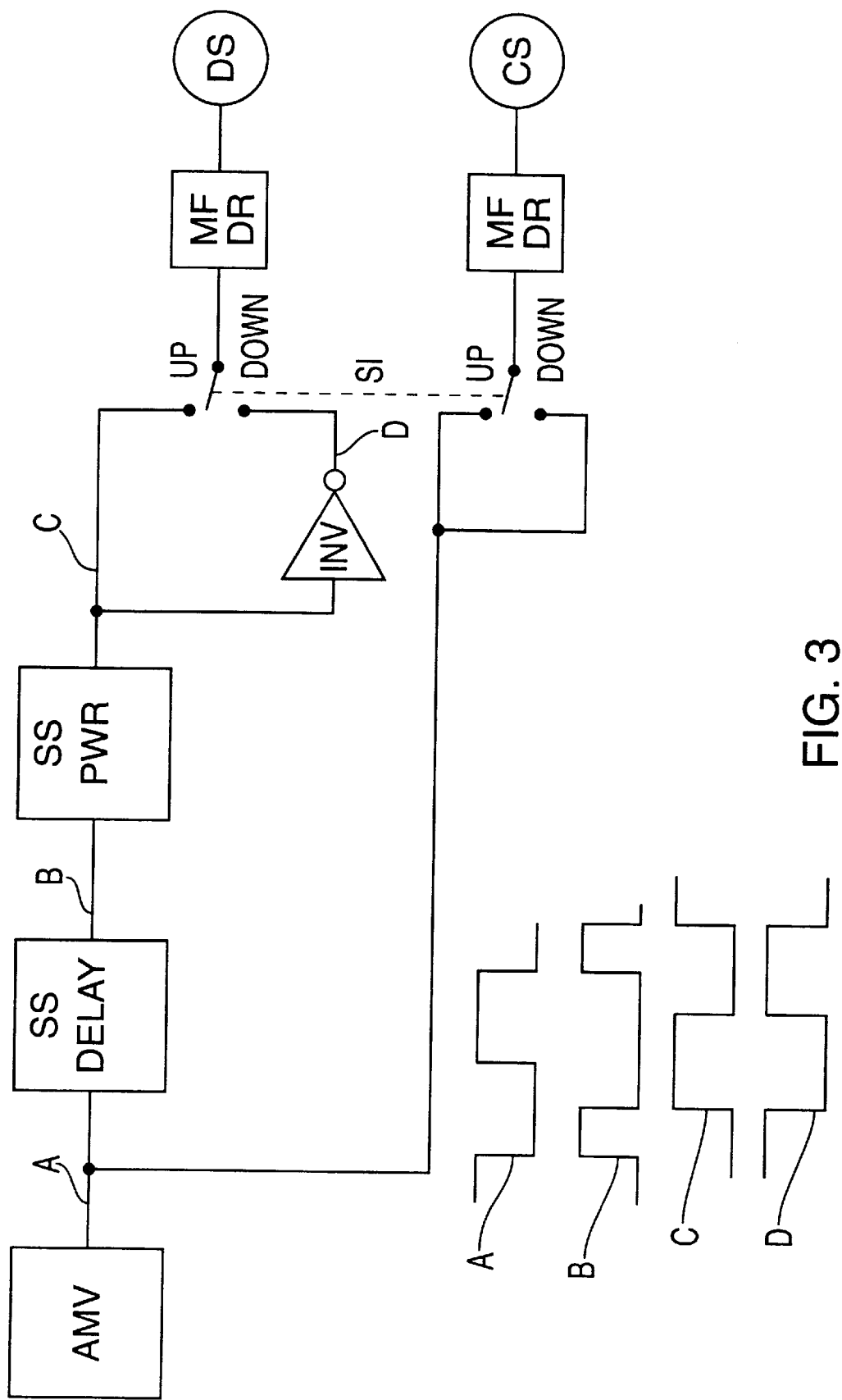
FIG. 3 is a drive circuit block diagram for pull solenoids for actuators of the present invention.

FIG. 3 shows a block diagram of a simple electronic driver for a pull solenoid system. It includes an astable multivibrator (AMV), driving a delay single shot (SS DELAY) which drives a second single shot pulse width restorer (SS PWR). In the demo system, AMV is a 555 timer while the two single shots are formed from one dual 556 timer module. A transistor inverter (INV) is used to provide the pulse for reversal. The various waveforms at different points are shown at the lower left of the figure. An ordinary DPDT switch, S1, is used to select up or down with MOSFET drivers (MF DR) driving the contact solenoid (CS) and the drive solenoid (DS). For a power window, a single speed reversible drive is required. Note that the dual tape power window configuration can be used as well for driving a power sun roof. If dual coil push-pull solenoids are used instead of the pull type with return spring, an ON/OFF type of unipolar driver can still be used, but both coils must be driven alternately on each cycle on each solenoid.

The circuit modifications outboard of switch S1 shown in FIG. 4 add an inverter and an extra MOSFET for each push-pull solenoid. INV1 driving through MF DR drives the return stroke coil of the push pull drive solenoid (PP DS). PP CS is similarly driven.

FIG. 5 shows a block diagram of a simple driver for voice coil type transducers. These are polarity sensitive units best driven by AC voltage sources; they have a permanent magnet field like a loudspeaker. A sine wave oscillator (SWO) drives an AC driver (AC DR) through one leg of S1 to power the contact voice coil (CVC). SWO also drives a 90 degree phase shifter (90 PS) which, in turn, drives a 180 degree phase shifter (180 PS). These two signals as selected by the other leg of S1 control the up/down direction and power the drive voice coil (DVC) through an AC driver (AC DR).

FIGS. 6 and 7 show two types of windshield wiper mechanisms.

FIG. 6 illustrates a timing belt system using one power unit synchronously coupled to the remote (left) wiper arm 41 via timing belt 39 which has a wear resistant high friction outer layer 40. Drive shell 35 serves a function analogous to that of drive block 13 in FIG. 2. It has a top plate 44 with access hole 43 through which right wiper arm 42 is coupled. The sides of 35 alternately contact belt 39 at the top or bottom of drive pulley 37. The illustration shows shell 35 being pushed up by contact transducer 32 through leaf spring coupling 34 leaving a gap 36 at the top. The drive transducer 31 drives shell 35 horizontally through leaf spring 33. This too is a double-acting driver action similar in operation and phase reversal requirements to the window regulator. For cases in which the left and right wipers must transverse different arcs on each stroke, pulley 38 can be a different diameter from 37. The actuator mechanism would be placed on the larger of the two pulleys. Roller chain or other flexible couplings such as bead chain may be used in place of the timing belt. In cases where the linkage medium is not suitable for driving by shell 35, the drive sprocket can be attached to a roller with a suitable friction surface.

FIG. 7A shows the concept of a "Syncro" windshield wiper mechanism. In this concept, two separately driven wiper arms are synchronized electronically through the use of a common power system. To reduce minor variations in friction drive slippage from accumulating, a gear 58 and dual rack frame 55 are used with a stroke of drive transducer 52 adjusted accurately to be equal to one gear tooth of advance. Gear 58 drives wiper arm 59. Contact transducer 51 drives through leaf spring 53 while transducer 52 drives through 54.

In FIG. 7B, the same functions are served, however, the two transducers are stacked one under the other and both underneath the gear 58 and rack frame 55. This creates a package with a smaller foot print but greater height. This shape may be advantageous. The same approach can be used to convert the planar drive mechanism of FIG. 6.

Figure 8:
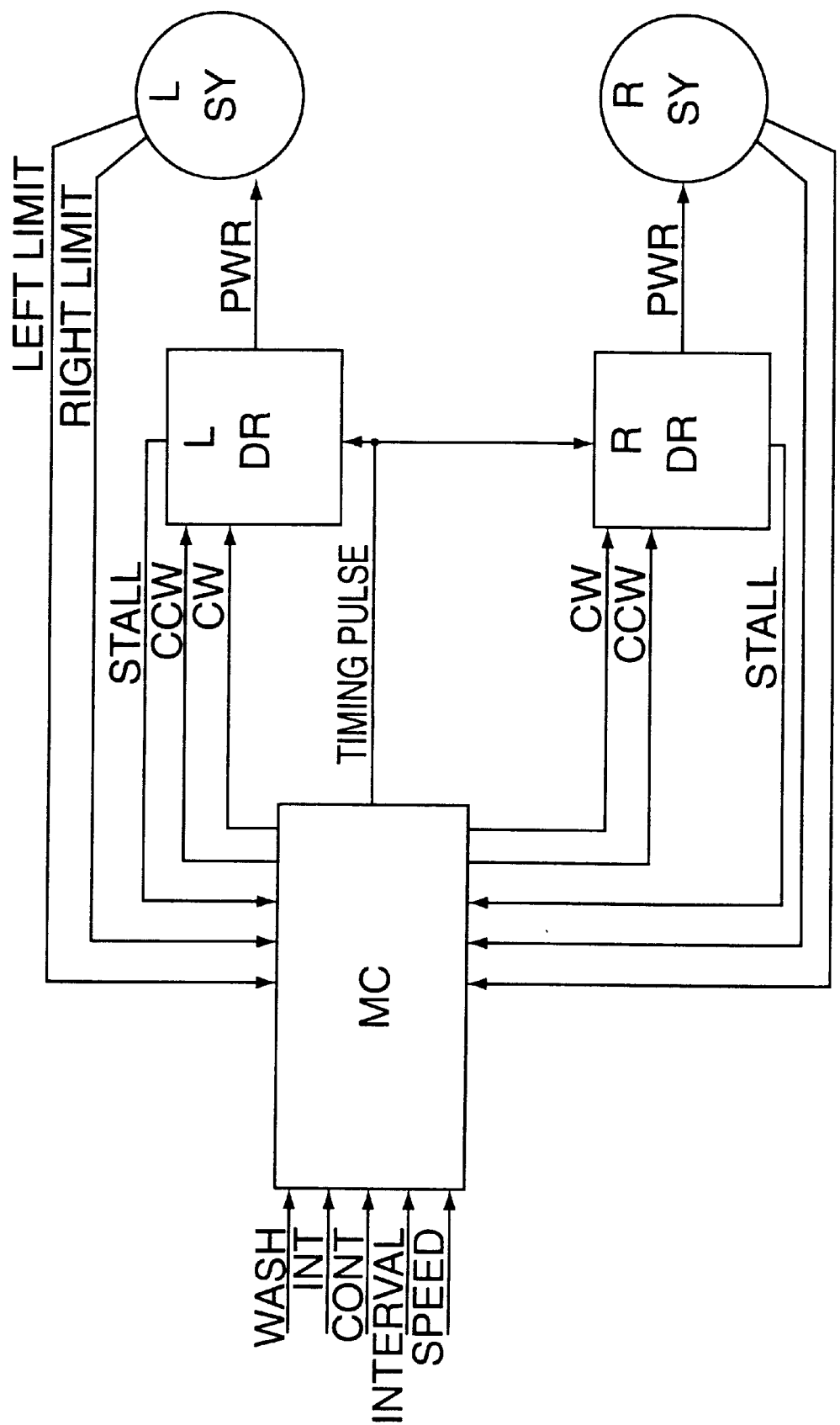
FIG. 8 is a block diagram of a "Syncro" type drive circuit.

Since windshield wipers are a reversible variable-speed multi-mode accessory, a micro computer control and drive electronics package as shown in FIG. 8 is a good operating choice. Computer MC accepts three mode inputs, wash, intermittent (INT), and continuous (CONT). Other user inputs are INTERVAL for intermittent use and SPEED for continuous use. The computer MC synchronizes both the left Syncro (L SY) and the right Syncro (R SY) units by sending a common timing pulse to both drivers (L DR and R DR). Direction and drive commands CW and CCW are controlled individually to each Syncro driver. Stall indications are detected by the drivers and the computer (MC) is alerted to run the appropriate software action routine. A right and a left limit sensor from each Syncro prevents any accumulation of error in synchronization. These limit sensors may be contact closures, reed switches, Hall-effect sensors or photo sensors as are common in the art. If one side stalls due to some malfunction or environmental problem, the other Syncro can function normally in "fail/safe" mode. Partial stroke operation without damage is also permissible.

Figure 9:
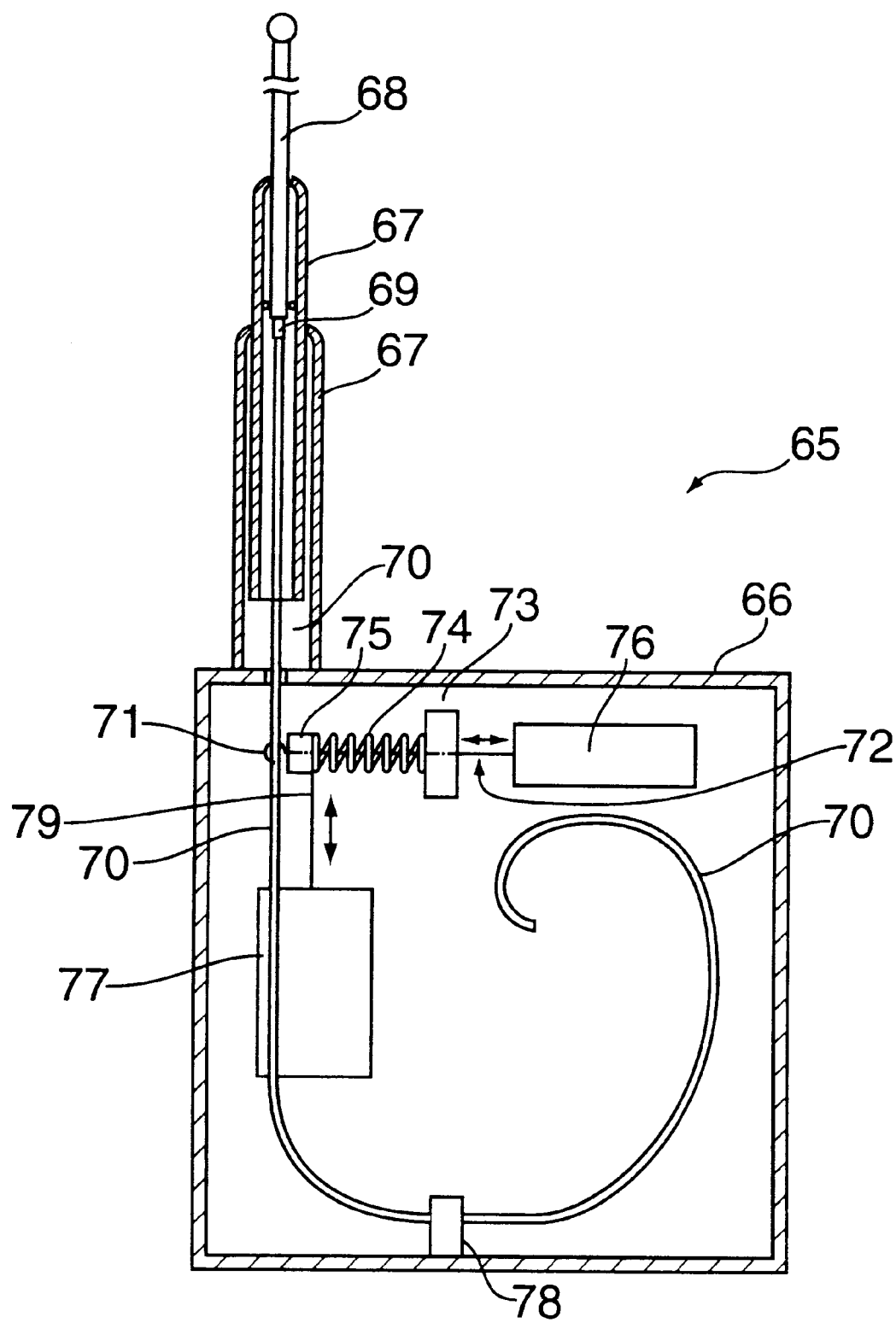
FIG. 9 is a front elevation in partial cross section of a power antenna.

Power antennas are a notoriously unreliable accessory even on luxury cars. The version 65 shown in FIG. 9 has a manual feature which permits the antenna to be raised or lowered manually at any time as a fail/safe backup. The housing 66 and the tubular sections 67 of the antenna mast are shown in cross section for clarity. Top mast section 68 is coupled through coupling 69 to a flexible round cross section drive member 70 which is guided through guide 78 to coil freely within housing 66. Contact transducer 76 is coupled to wire 72 which is threaded through stiff spring 74, block 73 and soft friction pad 75. At its distal end, wire 72 loops 71 around member 70. Drive transducer 77 can move block 75 up and down through leaf spring 79. The normal "off" position of transducer 76 is in the extended position with loop 71 loosely around 70. In this position, the antenna can be manually adjusted; it will remain as adjusted due to system friction. For powered operation, 70 can be pushed either up or down by transducer 77 while transducer 76 is putting tension on wire 72 thereby forcing a portion of 70 under loop 71 against friction pad 75. By selecting the proper phase relationship between the two transducers, the mast can be made to rise or fall. If pull solenoids with return springs are used as transducers 76 and 77, the drive circuit of FIG. 3 can be used for the power antenna. The demonstration model uses string trimmer line as member 70. The manual override feature can be designed out by simply making the "power off" position of transducer 76 the pull position.

Figure 10:
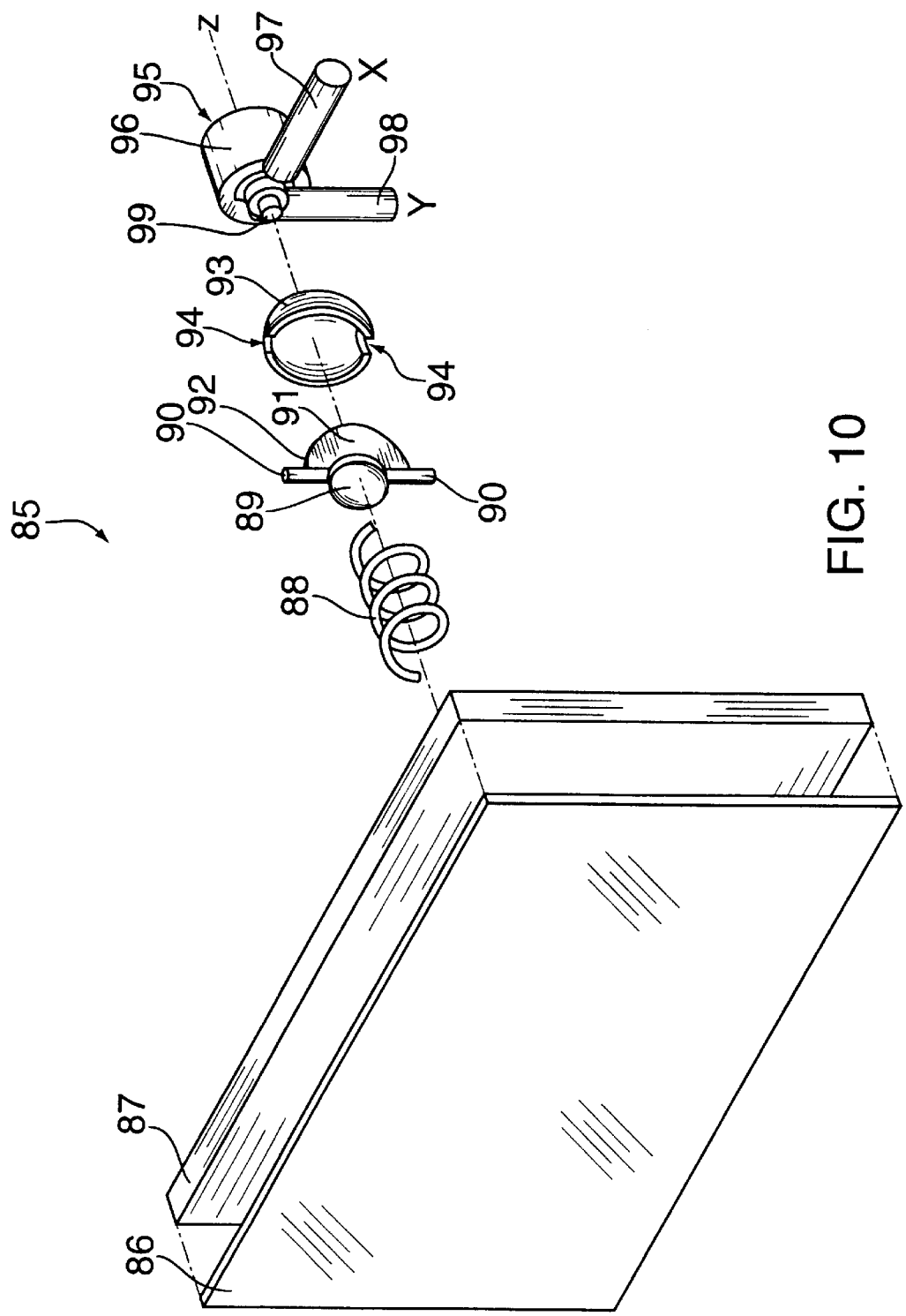
FIG. 10 is an exploded view of power side view mirror components.

Power side view mirrors have many internal parts. The exploded view of FIG. 10 reduces the parts count considerably. The housing is not shown in this view. Mirror 86 is adhesively bonded to backing plate 87. Spring 88 forces plate 91 with spherical edge 92 against the inside of notched hemisphere 93 which is bonded to plate 87. Disk 89 (with a depression) engages the end of spring 88 and is attached to shaft 90 which fits in notches 94. Driver subassembly 95 has three mutually orthogonal oscillatory transducers, 96 for contact, 97 for left and right movement and 98 for up and down adjustments. It is similar in configuration to a wheelless autonomous robot element of the parent application. A soft rubber contact boot 99 contacts the outside surface of hemisphere 93.

FIG. 11 shows these elements assembled within a housing 106 which is shown in cross section. Driver assembly 95 is attached to the inside back of housing 106. Shaft 90 ends snap into housing extensions 105. Boot 99 has a ridge that contacts the surface of 93 with power off maintaining the orientation of mirror 86. If it is bumped, however, it will yield without damage.

Inside boot 99 in the normally depressed central area is drive button 110 as shown in the detail of FIG. 12. When this button is pushed out by contact transducer 96, it relieves pressure from around the rim of 99 and permits either transducer 97 or 98 to move ball section 93 which adjusts the mirror 86 relative to housing 106. 111, 112 and 113 are spring wires which are rigid axially but quite flexible in a plane perpendicular to each wire.

Figure 13:
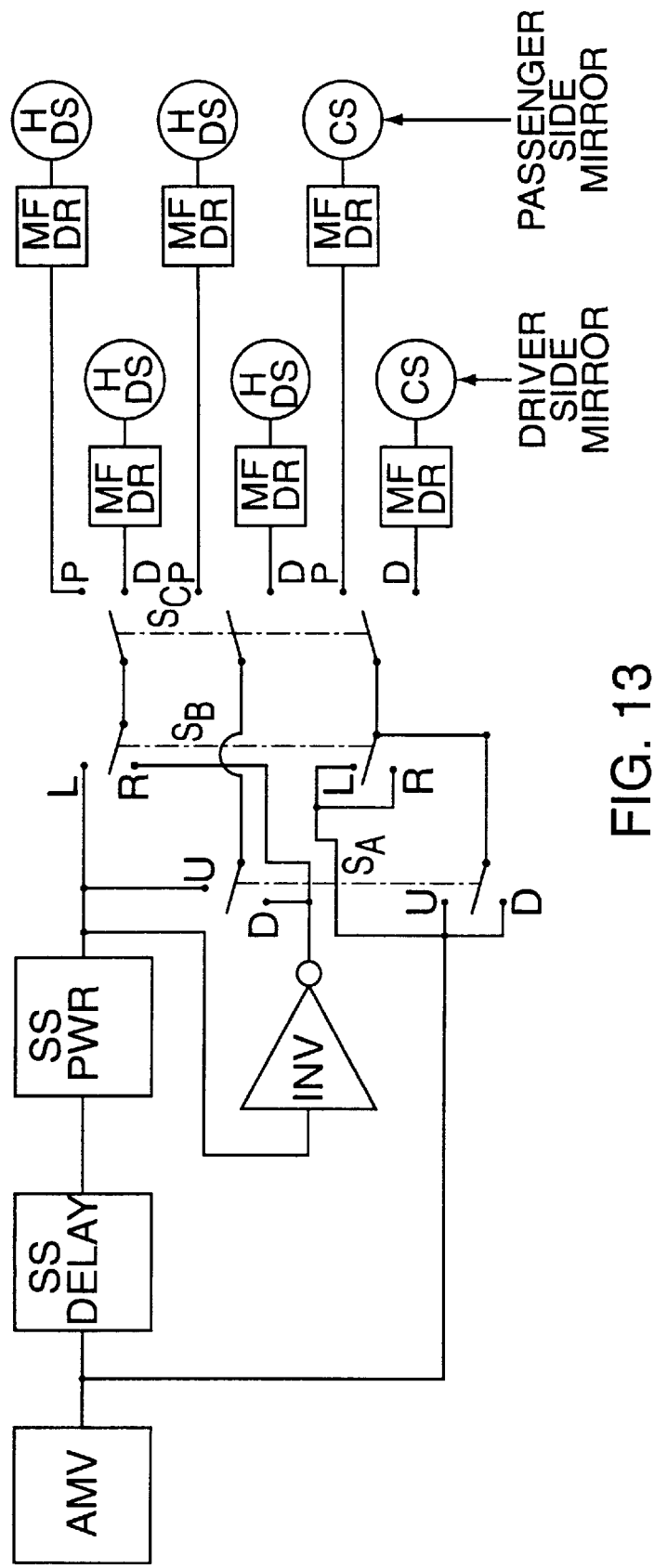
FIG. 13 is a switching circuit for a power side view mirror.
Figure 14:
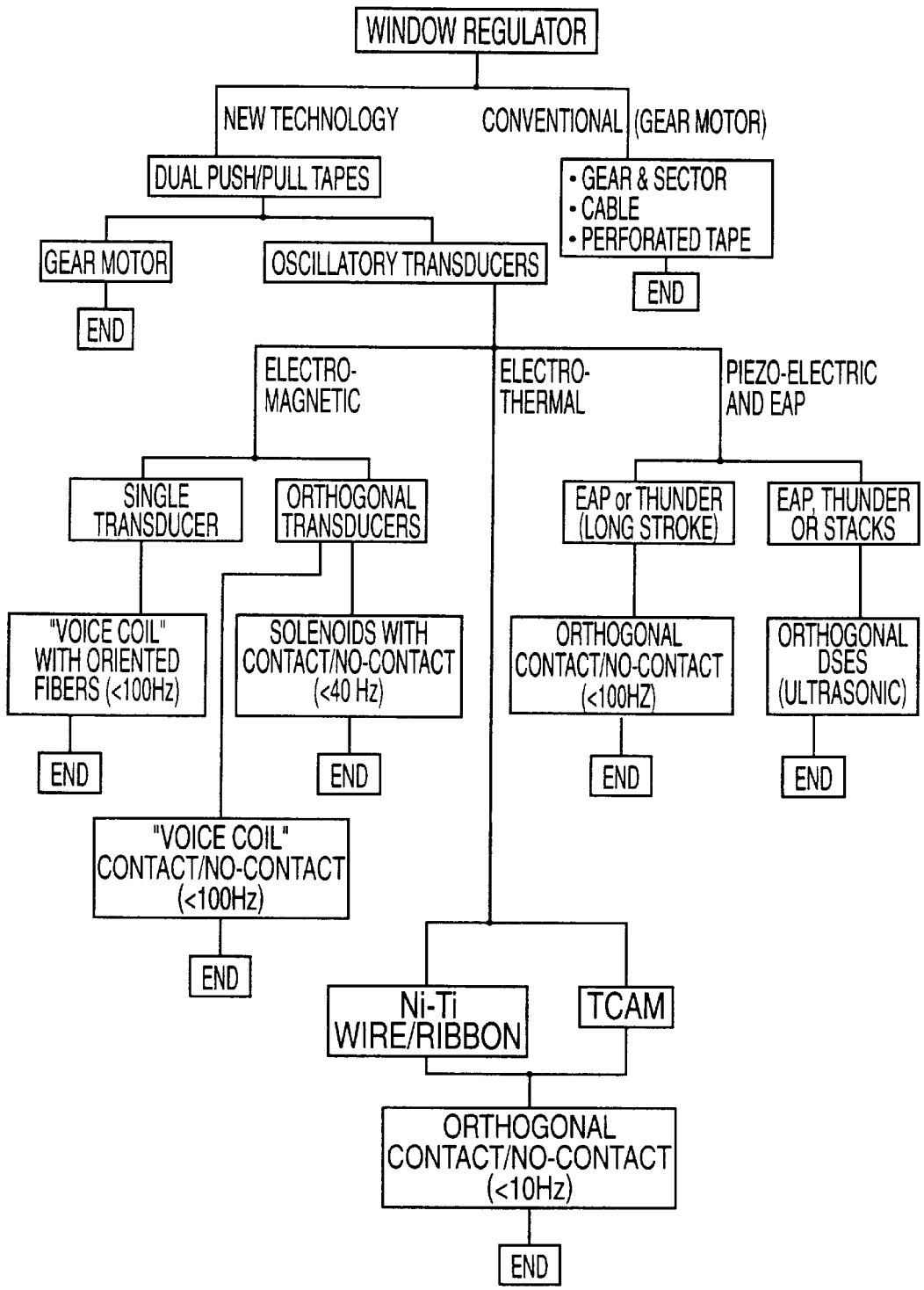
FIG. 14 is a species chart showing options for a window regulator.

If transducers 96, 97 and 98 are pull solenoids with return springs, the driver diagram of FIG. 13 will power it. Electronically it is identical to FIG. 3, however extra switches are required to properly drive the six transducers for both driver and passenger side mirrors. A three pole double throw switch Sc selects driver or passenger side; it is a rocker switch. Sb is a DPDT momentary switch which selects left or right adjustment of the preselected mirror. Sa is another DPDT momentary switch which selects up or down adjustment of the preselected mirror.

By using a slightly larger hemisphere 93 and an ultra-miniature driver assembly 95, the driver 95 can be placed inside hemisphere 93 driving the adjustments by contact to the inside surface of 93. Assembly 95 would replace plate 91. This would significantly reduce the size of powered side view mirrors. Because the force requirements are low, piezoelectric drivers or an array of MEMS transducer drivers may be adequate.

Although some of the mechanisms of this invention are related to motor vehicle applications, industrial or medical applications of similar devices are possible. Consumer products unrelated to motor vehicles may also benefit from the application of this technology.

Figure 15:
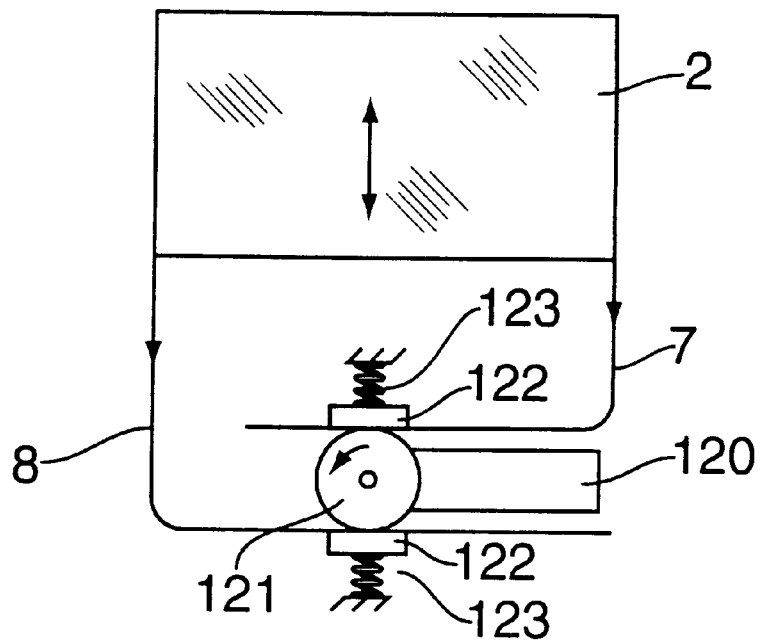
FIG. 15 is a front view design concept for a dual tape window regulator using a gear motor.

FIG. 15 shows a vehicle window 2 driven by semi-rigid drive tapes 7 and 8. Pressure pads 122 with a low friction surface against the drive tapes are spring loaded by springs 123. Friction wheel 121 resists the forces by pads 122; it is driven in either direction by a conventional window regulator gear motor 120. This is transitional hybrid technology that would enable the auto industry to migrate toward oscillatory actuator use before the latter technology is ready for the market.

Figure 16:
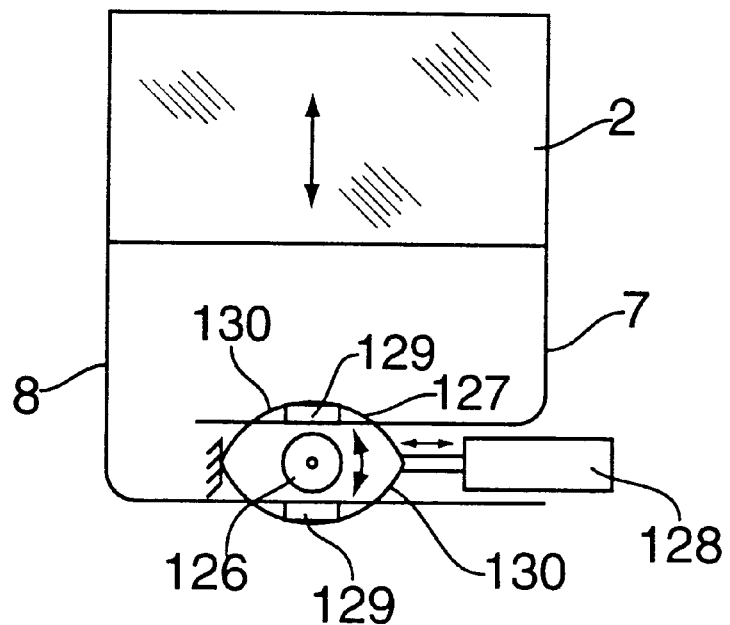
FIG. 16 is a front view design concept for an orthogonal transducer actuator incorporating a rotary solenoid.

FIG. 16 shows a window 2 again driven by tapes 7 and 8, but in this case two orthogonal oscillatory transducers are used. One is a linear transducer 128 which may be a pull solenoid with a return spring, a voice coil actuator, a push/pull solenoid or a non-magnetic type. It cyclically operates a force device 127 with low friction pads 129 at the center of two leaf springs 130 which can simultaneously force both tapes 7 and 8 against friction wheel 126. A rotary solenoid (not shown) oscillates friction wheel 126 continuously through a short angle at the same frequency as the force device 127 is driven by linear transducer 128. It can be appreciated that the window can be driven either up or down by judicious selection of the phase relationship between the motion of the friction wheel 126 and the force device 127. For example, if transducer 128 pulls thereby forcing tapes 7 and 8 against wheel 126 only during periods when it is moving clockwise, the window will go up. If it pulls only during counterclockwise movements, the window will go down. In this example, the orthogonal relationship between transducers is torsional versus linear.

Figure 17:
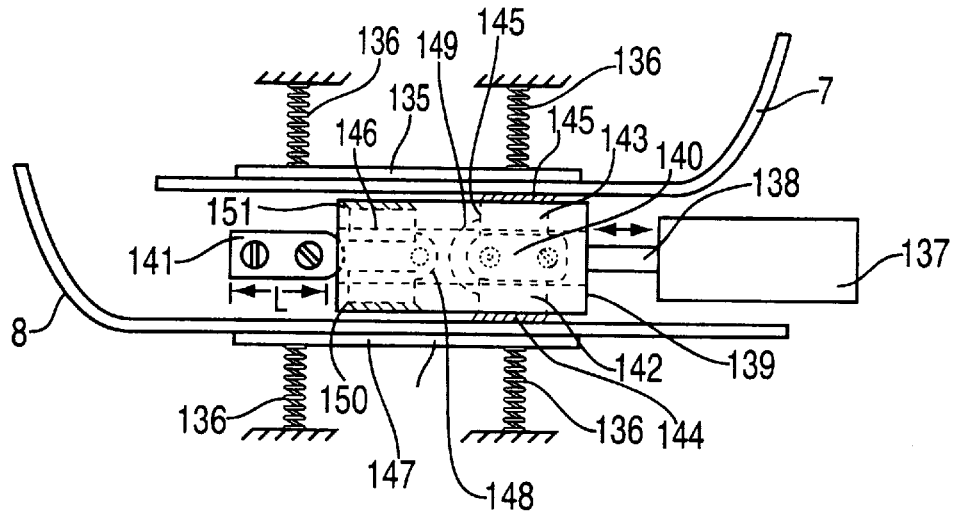
FIG. 17 is a front view detail for a single linear transducer driver for a window regulator.

FIG. 17 shows a single linear transducer 137 driving the two tapes 7 and 8 of a window regulator. A material with anisotropic friction characteristics (slips in one direction/grabs in the other) is used to engage the tapes. While many mechanisms are known with this property, the use of oriented fibers is the most simple and compact. A shuttle 139 is rigidly attached to long stroke transducer 137 by shaft 138. Usable transducers are voice coil actuators, and pneumatic or hydraulic cylinders (although the latter are less useful for vehicle applications). Transducer 137 is attached to a base (not shown). The shuttle 139 has side pockets which hold four blocks with oriented fibers on an outer surface. In the pictured position, blocks 142 and 143 are pushed out of the sides of 139 by stationary spreader 140 so that their oriented fiber surfaces 144 and 145 are in intimate contact with tapes 8 and 7 respectively. In this general position, transducer 137 will oscillate in short strokes. The orientation of fibers 145 will drive tape 7 to the right with every right stroke, fibers 144 will drive tape 8 a small amount left with every left stroke; thus the window will go up. Low friction pads 135 are forced by springs 136 to maintain constant pressure of the inner surfaces of tapes 7 and 8 against shuttle 139. Note that blocks 146 and 147 are within shuttle 139 by virtue of spring 148; these have fibers oriented in the opposite directions and are used for the "window down" operation. Spreader 140 has overcome the force of spring 149 which tends to pull blocks 142 and 143 in. To reverse window direction, transducer 137 will move shuttle 139 a long stroke left (distance "L") and resume oscillating at this new location. This action will force shuttle 139 over fixed spreader 141 simultaneously disengaging from spreader 140. Thus blocks 142 and 143 will retract while blocks 146 and 147 will engage the drive tapes 7 and 8 to drive in the opposite direction.

Figure 18:
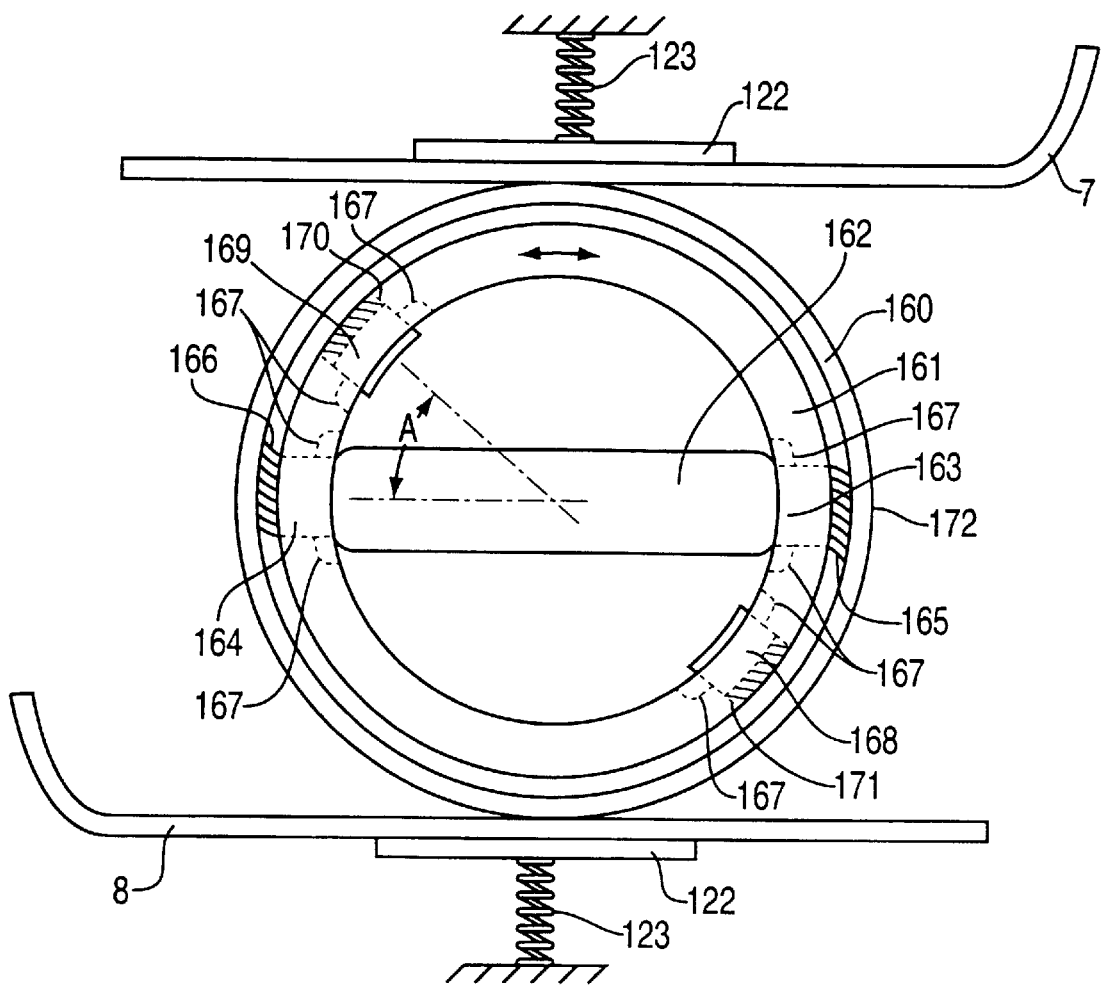
FIG. 18 is a front view detail for a rotary single transducer driver for a window regulator.
Figure 19A:
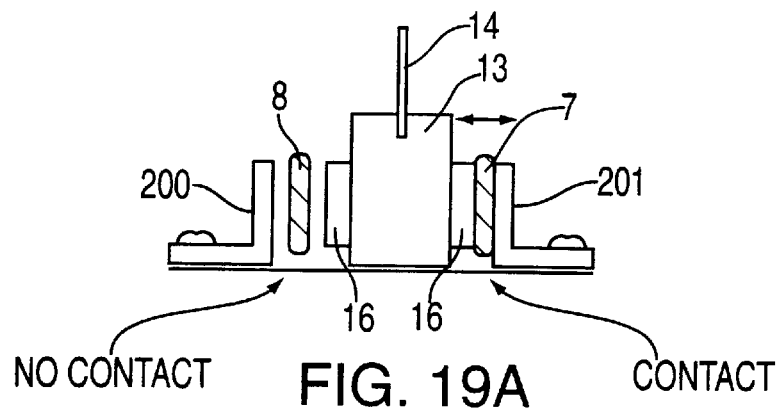
Figure 19B:
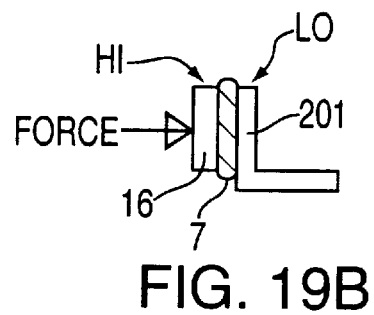
Figure 19C:
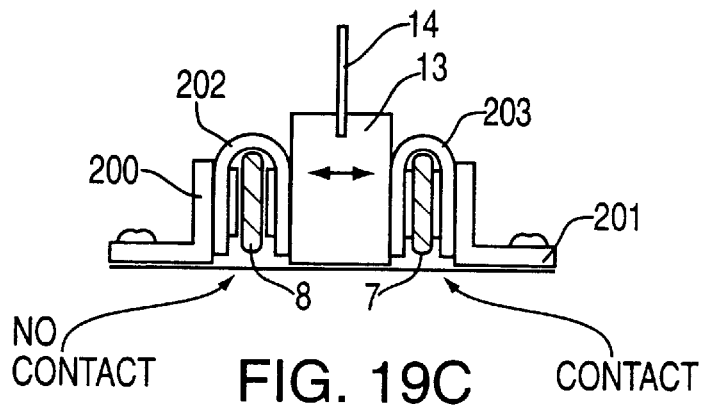
Figure 19D:
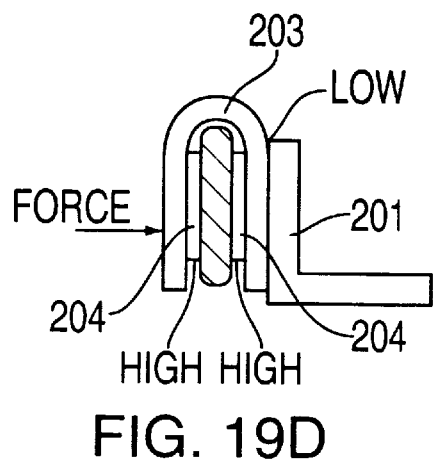

FIG. 18 shows the rotary analog of the linear drive scheme of FIG. 17. Here a shuttle ring 161 is oscillated through a small angle by a long stroke rotary transducer such as a rotary solenoid or a hydraulic or pneumatic rotary actuator. In the position shown, stationary cam bar 162 has forced blocks 164 and 163 out of pockets in ring 161 against return springs 167. Oriented fiber 166 and 167 will drive friction ring 160 clockwise with every clockwise stroke and slip with every counter-clockwise stroke. Thus friction ring 160 will be driven clockwise and tape 7 will be driven right while tape 8 will be driven left; the window will go up as the tapes are forced by low friction pads 122 via springs 123 into intimate contact with the high friction outer surface of friction ring 160. By shifting the operating point of shuttle ring 161 counterclockwise through angle A and oscillating there, blocks 169 and 168 will be engaged while 163 and 164 are disengaged. Since the fiber ends are pointed in the opposite direction, the friction ring will be driven counterclockwise and the window will be pulled down.

FIG. 19 shows an end view of two mechanisms for a window regulator using two orthogonal linear transducers. In FIG. 19A, a drive block 13 with two side friction pads 16 shuttles left and right to alternately squeeze tape 7 or tape 8 between the high friction surface of the pads 16 and the low friction surface of reaction brackets 200 or 201. This is essentially the same as the embodiment of FIG. 2 with reaction brackets replacing rollers. The detail of FIG. 19B shows the side force more clearly. Leaf spring 14 which is oscillated at the same frequency (in or out of the page) then moves a particular tape in or out based on the phase relationship of the relative motions. For proper operation, the clamping force times the difference of the friction coefficients on either side of a drive tape must be higher than the desired force transmitted by the tape, otherwise slippage will occur and progress swiftly as the static friction coefficients are swapped for the lower dynamic coefficients. A different apparatus in FIG. 19C shows how the frictional force transmitted to a tape can be approximately doubled for a given clamping force and friction coefficient. The simple high friction pads 16 are replaced by a spring metal frame 202 and 203 attached to each side of drive block 13 and surrounding the drive tapes 8 and 7. Two thin high friction pads 204 are attached to the inside surfaces of the springy metal frames 202 and 203 which are biased to open away from the drive tape surfaces. As block 13 is forced right, the clamping force squeezes tape 7 between two high friction pads 204 thus using both the clamping force as well as the reaction force (equal and opposite) to contribute a frictional locking force of the clamping force times the friction coefficient of the pad interface. The low friction surface of the bracket 201 now impinges against the outside of the metal frame 203 which should result in an even lower friction coefficient as compared to bracket against tape. The detail of FIG. 19D shows this more clearly.

Figure 20:
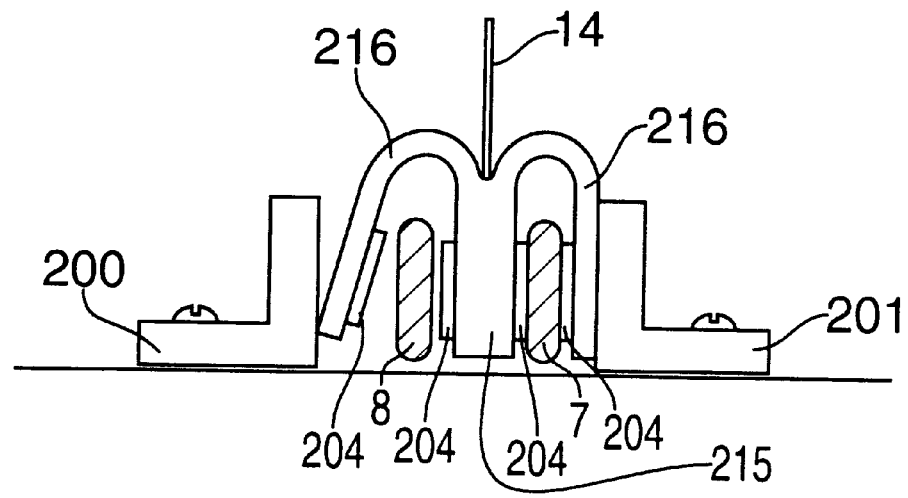
FIG. 20 is an end view of a molded version of an improved apparatus.

FIG. 20 shows a molded or extruded version of the same drive block 215 with integral springy side wings 216. It is shaped to be in the normally open position until squeezed by clamping force.

Shape memory wires such as the Flexinol trade name of Dynalloy Corp. will shorten by up to 5% of their length when heated above a certain transition temperature. These wires of an alloy of NiTi are extremely light weight as compared to any transducer of comparable force output. They can transition to the short state in a few milliseconds by passing a current through them, however the cooling period is longer when natural convection is used as the cooling mechanism. Since the alloy process can be used to determine the transition temperature to some extent, a higher temperature wire will cool faster to below the transition temperature given a certain ambient temperature. So for a cyclic application where it is desired to achieve higher frequency, the higher the transition temperature the better 100 degrees C. is commercially available. Higher temperatures are possible. Another means is to form the wire into a thin ribbon thereby increasing the surface area to volume ratio enhancing convective cooling. Silicone thermal grease has been used to some advantage as have liquid immersed NiTi wires. The industry has little experience in high force/high power cyclic applications as would be required for window regulators or windshield wiper applications. Operating life for these applications is also questionable at this time. The side view mirror application does seem to be especially well matched to this use however. A relatively low frequency (<6 Hz) can work well here. Force requirements are low so that small thin ribbons or even wires may cool fast enough. The low life cycle requirements for this application permit the NiTi elements to be driven harder (even smaller cross sections possible for better cooling) and still provide adequate product life. The weight and size advantages of this technology is of great advantage for this mirror application.

Figure 21:
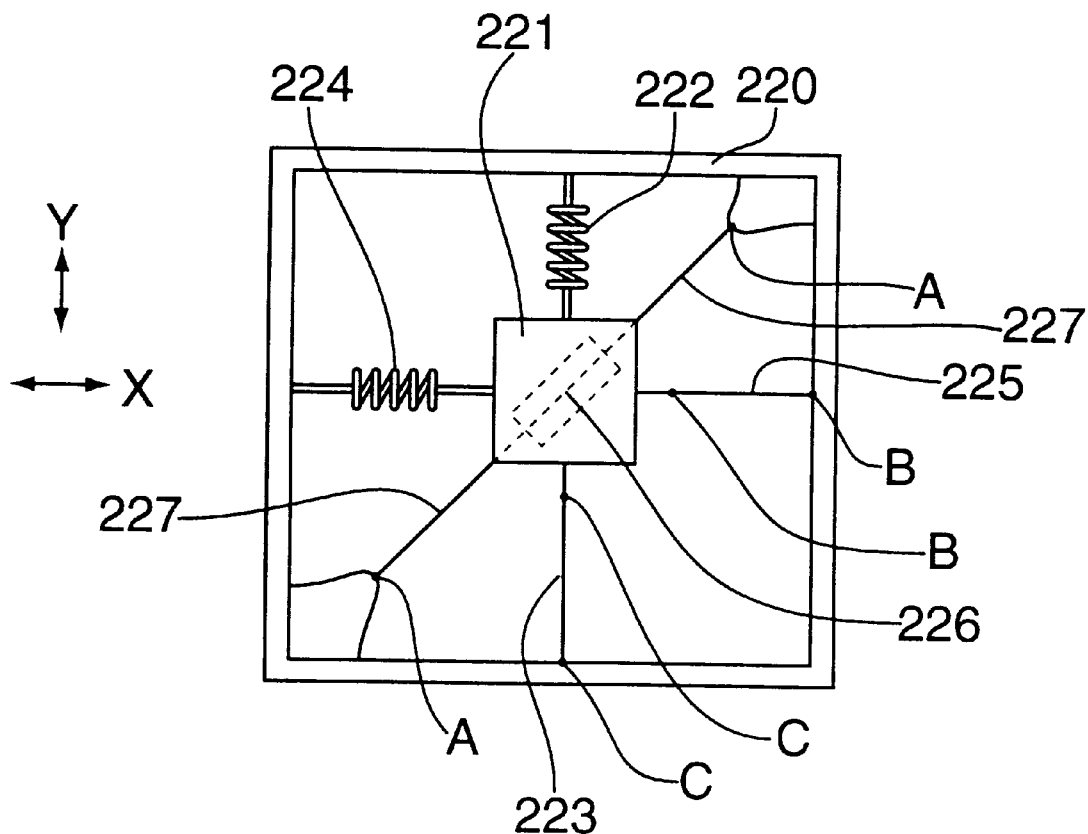
FIG. 21 is a top view of an actuator for a side view mirror using shape memory elements.

FIG. 21 shows a top view of the triaxial actuator for a mirror.

Figure 22:
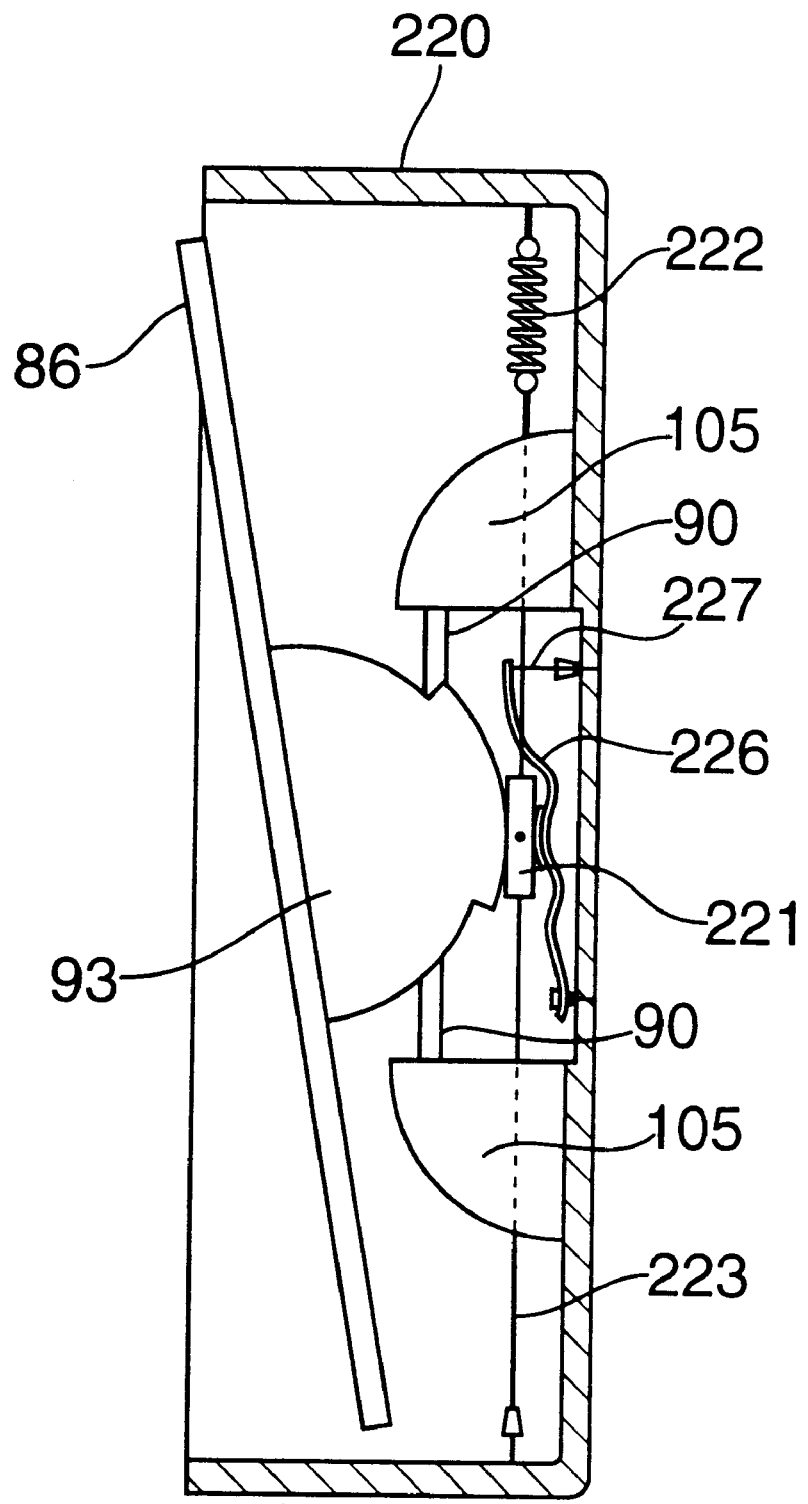
FIG. 22 is an internal side view of a side view mirror using shape memory elements.

FIG. 22 shows a side view of the internal components of a mirror using the actuator of FIG. 21. Basically, a pad 221 with a high friction top surface and a low friction opposite surface is centrally suspended in a housing by spring 222 balancing NiTi wire element 223 and spring 224 balancing NiTi wire 225 in a coplanar orthogonal configuration. A third wire at an oblique angle 227 has the ability to compress leaf spring 226 when heated. Thus by cyclically heating wire 223, pad 221 will cyclically move in the Y direction. Cyclically heating wire 225 will move pad 221 cyclically in the X direction. Cyclically heating wire 227 will move pad 221 cyclically in the Z direction where it will make or break contact with hemispherical surface 93 attached to mirror 86. Since the mirror has the necessary degrees of freedom, it can be appreciated that by driving wire 227 at the same frequency as either wire 223 or 225 and selecting the proper phase relation, the mirror can be made to turn up and down or left and right.

Figure 23:
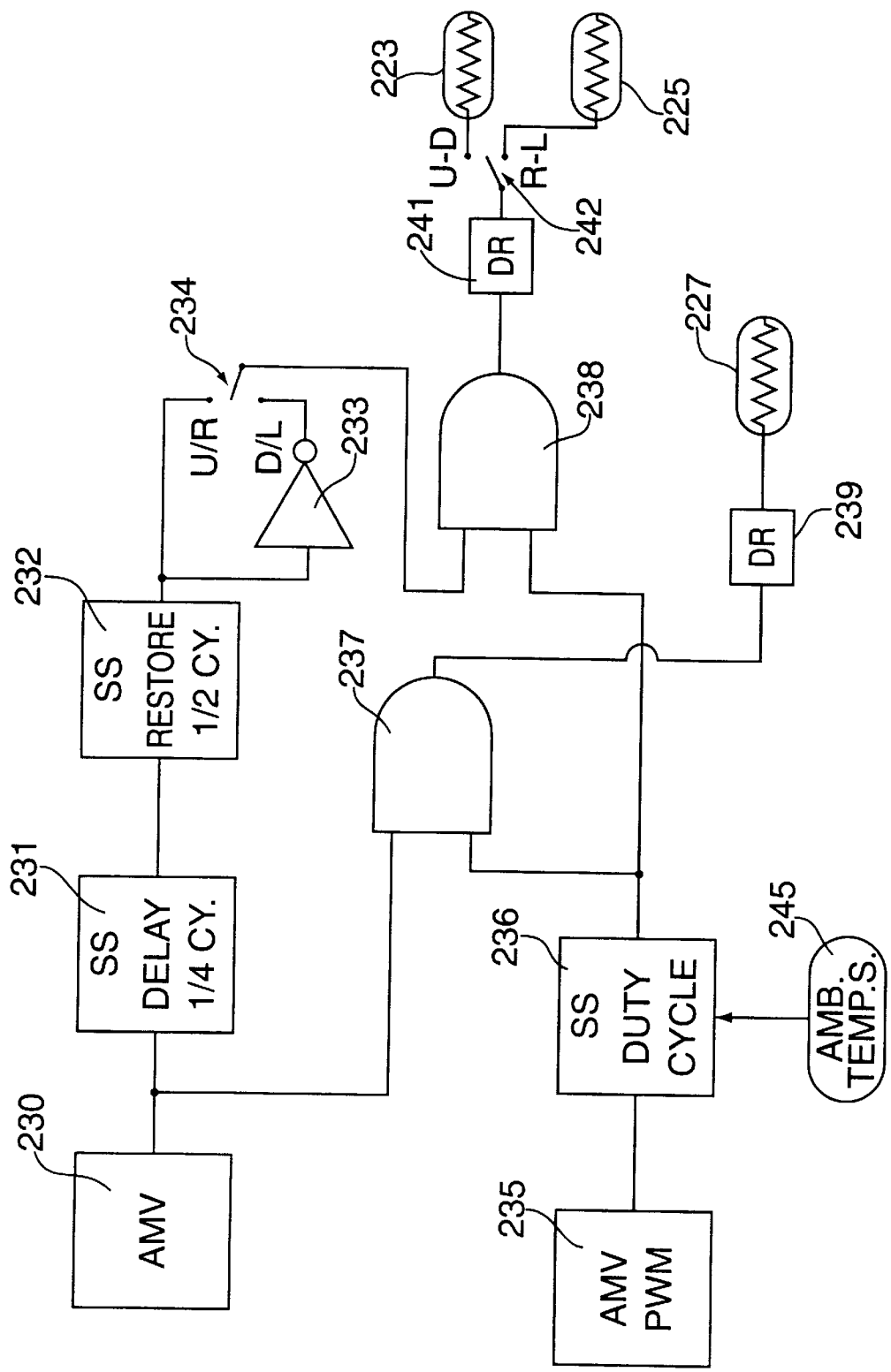
FIG. 23 is a block diagram of a driver for a side view mirror using shape memory elements.

FIG. 23 shows a driver circuit for a single mirror; additional switching can be used to drive mirrors on both sides of a vehicle. Asynchronous multivibrator 230 produces a 50% duty cycle square wave at the basic system operating frequency (<6 Hz). Single shot delay 231 produces pulses with a quarter cycle delay width. Single shot 232 restores the pulse width to that emanating from block 230, but this pulse train is a quarter cycle later. Inverter 223 is used to provide a pulse train that leads the basic pulses by a quarter of a cycle. Asynchronous multivibrator 235 is a higher frequency chopper (it may be set at 1 kHz for example). Single shot 236 sets a duty cycle that would equalize the heating and cooling times of the NiTi wire elements; since the cooling time is a function of the ambient temperature, an ambient temperature sensor 245 is used to adjust the duty cycle of these short high frequency pulses to match that of the anticipated cooling time. AND circuit 237 combines the high chopper frequency at the proper duty cycle with the basic system frequency to driver 239 driving the contact element 227 so that it can heat and cool such that approximately equal periods of long and short wire (contact or non-contact) result. Similarly, AND circuit 238 combines the chopper output at 236 with the basic phase shifted low frequency as selected by switch 234 to driver 241. Switch 242 delivers this drive signal to either element 223 for up or down movement or to element 225 for left or right movement.

Figure 24:
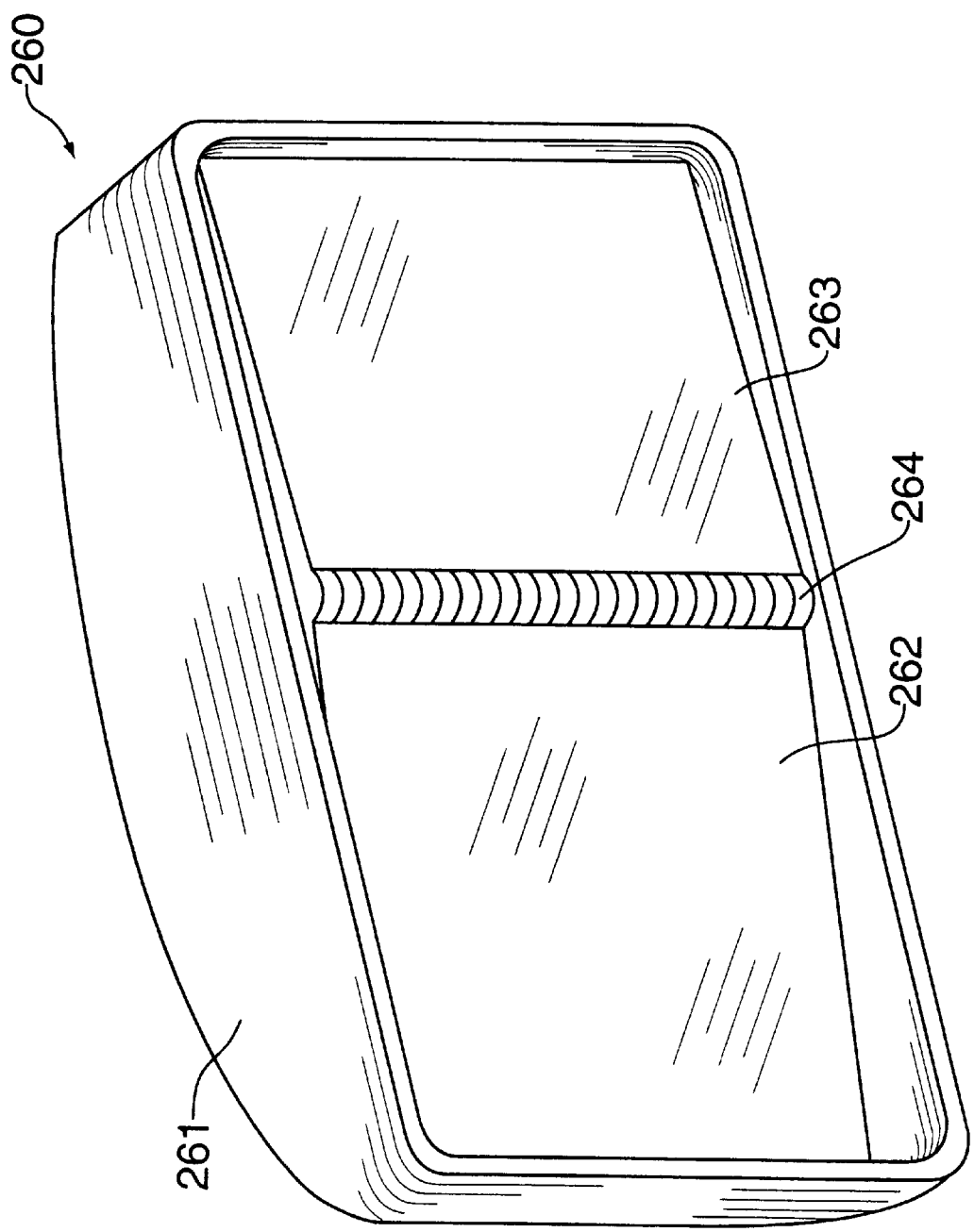
FIG. 24 is a perspective view of a dual element power side view mirror.

FIG. 24 shows a dual power side view mirror 260 enclosing two separate drive mechanisms in housing 261. Two separate mirror elements 262 and 263 are adjustable as to lateral angle and tilt. A central elastomeric gasket strip 264 is used to seal the gap between 262 and 263 while permitting full powered adjustment. Such vehicle dual mirrors 260 would reduce the chance of blind spots without resorting to curved mirror surfaces with their attendant distortion. This type of dual powered side view mirror 260 is only practical using the compact drive mechanisms described in this invention.

Piezoelectric elements have traditionally produced high forces at quite short (several micron) strokes or larger displacements of bimorph type configurations at very small forces. These latter configurations have also been quite fragile. Another choice now exists. Face International Corporation of Norfolk, Va. is producing transducers under the THUNDER® trade name under license from NASA. These are rugged elements made by bonding a piezoelectric element between two metallic outer layers. Another feature of these elements is the ability to drive them at low frequency (<100 Hz) to produce force and strokes comparable to much heavier solenoids. In addition, they may be driven at ultrasonic frequencies to produce small excursions equivalent to those produced by well-known piezoelectric stacks at significant force levels. By using THUNDER® units as replacements for solenoids in similar apparatus, orthogonal pairs are able to perform as window regulators or windshield wiper actuators at somewhat higher frequencies (up to 100 Hz) as long as thermal dissipation or high voltage requirements (about 500 volts) can be accommodated.

A more desirable piezoelectric application involves the use of ultrasonic frequencies to minimize acoustic noise and provide unmatched smoothness. The challenge is to use these elements directly in a hostile environment using low cost manufacturing techniques. The piezoelectric linear actuators produced by Burleigh Industries and by Anorad Corp. are well known laboratory devices. They are high precision, expensive and delicate. To use a contact/no-contact frictional drive scheme with strokes of the order of ten microns or less requires high precision manufacturing techniques. The enabling technology to achieve the desired objectives is the Dynamic Surface Engagement Switch (DSES). Instead of a contact/no contact friction drive approach, consider using an element which is under constant preload against the driven element. If one were to move this element back and forth, it would either drive the driven element back and forth if the friction coefficient were high enough, or it would slip against the driven element. In the present invention, this element is the DSES, and it can dynamically switch degree of surface engagement of its surface in contact with the driven element from a high to a low value or vice-versa. (The effect is equivalent to dynamically changing the friction coefficient even though the actual mechanism at the surface interface involves local surface elastic deformation.) Consider the equivalence of this capability in selecting drive direction to the contact/non-contact approach. This substitution is compatible with the stroke limitations of a piezoelectric driver at high frequency and is the enabling concept relaxing the precision constraints of using such transducers. Electrostatic EAP transducers may soon be developed which would be a viable substitute for the piezoelectric transducers.

The combination of a DSES with a linear piezoelectric actuator results in a piezoelectric thruster. A crude version of this arrangement using two solenoids with return springs driven at subsonic frequency has been used to demonstrate the soundness of the thruster configuration. A low frequency pneumatic thruster using a mechanical DSES has also been demonstrated. FIG. 25 shows a side view of a piezoelectric thruster using a piezo stack 303 as the linear drive element and a smaller piezo stack 306 driving a flextensional housing 305 to operate the DSES 4. Single or compound THUNDER® strip elements can be used as substitutes for the stack elements shown. The flextensional housing 305 as well as the stack 306 can be replaced by one or more THUNDER® elements. The DSES 304 can be designed to be in its high or low friction state with power off. The unit is built on base plate 301 to which motion piezo stack 303 is rigidly attached via bracket 302. The distal end of 303 is rigidly attached to DSES 304 and can move it several microns left and right at high frequency. The bottom surface 312 of DSES 304 is a low friction surface against base plate 301. Top surface 313 is also inherently low friction against output member 8 which is preloaded by force N acting on plate 310 with low friction surface 311.

FIG. 26 shows a flexible metal plate 307 which has been die perforated to form tabs 320.

FIG. 27 shows a perspective top view of DSES 304 revealing slots 325 in registration with tabs 320 and illustrating the front top edge of DSES of 304 where edge 321 of plate 307 is welded or otherwise bonded. The distal edge 321 is welded at the back top edge of 304; plate 307 is bowed as shown in 322 when welded in place in the housing of DSES 304. The tabs 320 will protrude through slots 325 in direction 326. Flextensional housing 305 with stack 306 within (or an equivalent THUNDER® actuator) is mounted within 304 such that the top of 305 touches the bottom of plate 307 and forces tabs 320 out slightly. The next production step must be made after it is decided whether the thruster will be low or high friction with power off. If it is to be high friction with power off, 306 should be powered up to withdraw tabs 320 to the maximum inward position before surface 313 (including protruding tabs 320) is ground and lapped to a smooth finish. When power is turned off, the tabs will protrude several microns beyond top surface 313. If the desired configuration is for low friction with power off, the grinding and lapping steps are performed with 306 in the power down state. In this way, the simple task of grinding and lapping is substituted for submicron fabrication and alignment. Obviously, the construction of the plate 307 and elements that protrude such as tabs 320 can vary. The more important key steps are the grinding and lapping operation to achieve a smooth surface that can be penetrated by extended elements in a dynamic fashion. By driving stack 306 and stack 303 at the same frequency (which can be ultrasonic) and manipulating the phase relation between them, motion of the output member in either direction is achieved at will. Note that a thruster designed for high friction power off will be self locking at its last position. The surface of the driven element must be designed to be compatible with the excursions of the engagement elements, the operating frequency, and the required product life.

FIG. 28 shows details of a piezoelectric thruster using THUNDER® elements.

One is shown in FIG. 28A. These are available in various lengths and widths. The base of the THUNDER® element (also one of the two electrical contacts) is a springy stainless steel curved plate 321. The piezoelectric element 322 is covered with an aluminum contact layer to which a conductive tape 323 is attached.

FIG. 28B is a side view with a front panel removed. It shows the driven element 308, thruster base 332, DSES 333, back panel 331, driver housing 329, end brackets 330 and 328, linear return spring 327, and pressure spring 326 which forces DSES 333 against the driven member 308 surface.

The top view of FIG. 28C shows front panel 336, top cover 339 of DSES 333 and a compound arrangement 337 of four THUNDER® elements to provide more force (the nested pairs) and more stroke (clamshell arrangement of the two nested pairs).

The end view of FIG. 28D shows DSES 333 details. An engagement plate 340 holds an array of engagement pins 341 which can protrude through the holes 343 through bottom plate 342 to deform the top surface of member 308. U-shaped leaf springs 344 are welded or adhesively bonded between plate 340 and plate 342 to permit the desired action under actuation by DSES THUNDER® actuator 338.

Two piezo thrusters can be used as a window regulator with a separate thruster to drive each tape; high friction power off types will lock both tapes in any position. Similarly, two orthogonal thrusters preloaded onto the hemispherical surface of a mirror mechanism can drive it up or down or left and right; these should be low friction power off types so that they won't interfere with each other.

The design of a curtain machine (or a generalized long-stroke curvilinear actuator) using a long stroke linear actuator (such as a voice coil actuator) is shown in the various views of FIG. 29. This embodiment uses a very inexpensive drive element on a per unit length basis. The curtain puller itself is unpowered so that no wires or conductive traces are required.

Figure 29A:
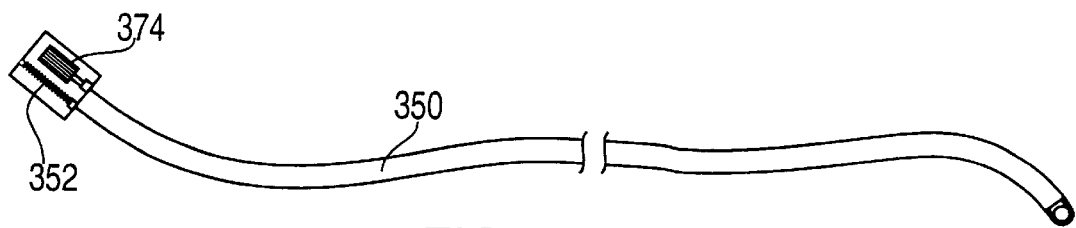

In FIG. 29A one sees a top view of the track 350 which can be straight or curved.

Figure 29B:
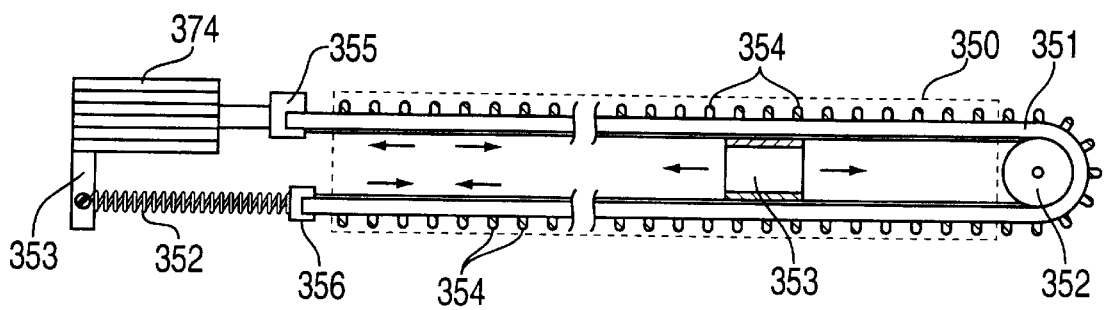

FIG. 29B is a top view detail with only the outline of the track 350 shown for clarity. The curtain machine depends on oscillating belt 351 to transfer force to move carriage 353. A long-stroke linear transducer 374 (such as a voice coil type) is aligned with tension spring 352 through bracket 353. Couplers 355 and 356 attach the ends of belt 351 to transducer 374 and spring 352 respectively. Belt 351 which has ribs 354 on its back (see FIG. 29E) also has strips of linearly oriented brush-type fibers 364 and 365 (oriented in opposite directions) along its inner length. It rides on pulley 352 at the end of track 350.

Figure 29C:
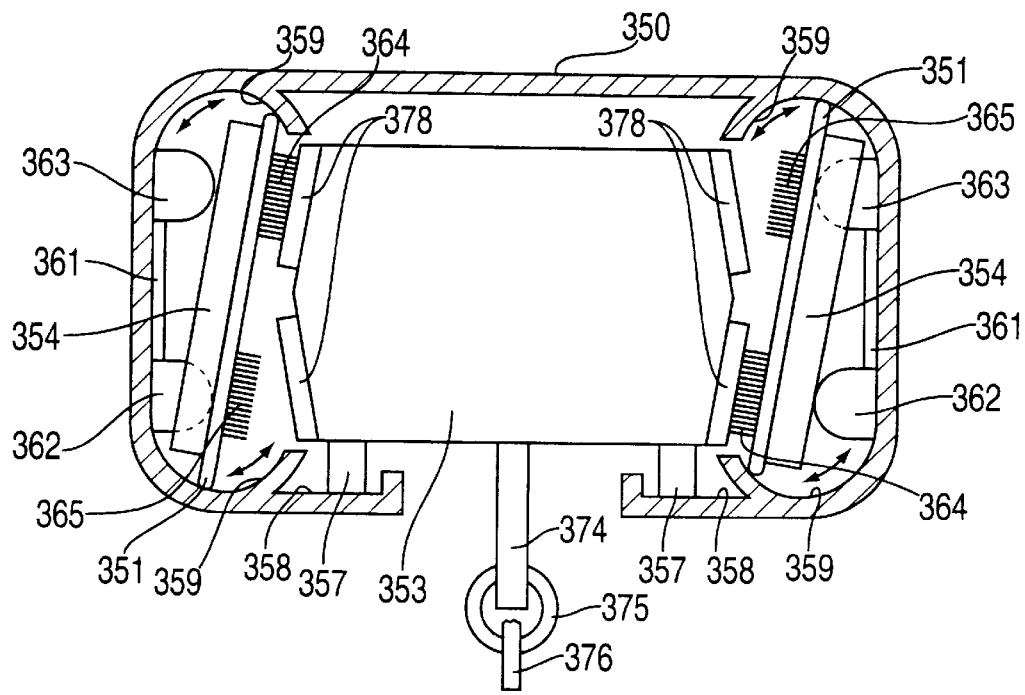
Figure 29D:
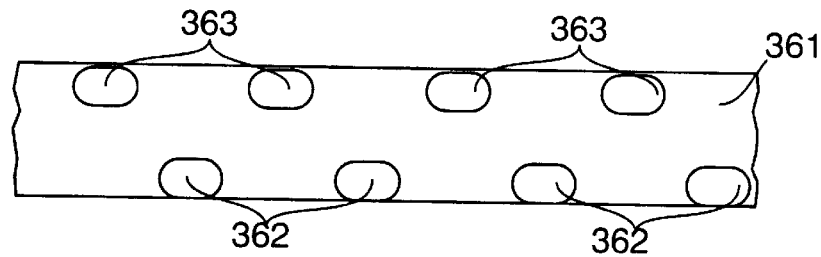
Figure 29E:
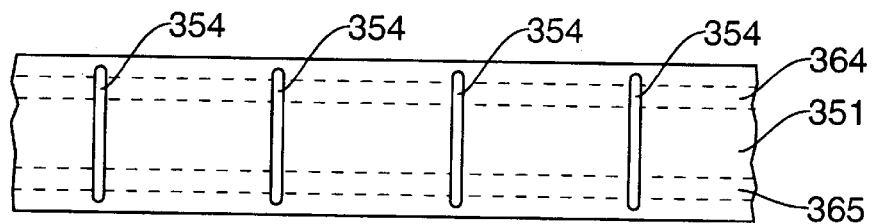

FIG. 29D shows a detail of a length of tilt strip 361 with top bumps 363 and bottom bumps 362. This is molded of a low wear and low friction thermoplastic such as HDPE.

FIG. 29C is an end view of track 350 in cross section (an aluminum extrusion) also showing carriage 353 supported by wheels 357 and extending attachment tang 374 which attaches curtain 376 via curtain ring 375. The carriage has four hardened fluted surface engagement strips 378 mounted at strategic angles to mate with one oriented fiber strip 364 or 365 at a time depending on the belt 351 tilt induced by the position of the bumps 362 or 363 on bump strips which are attached to the inner sides of housing 350. Rounded surfaces 359 locate belt 351 but permit it to tilt in one direction (as shown) or another. To select the desired direction, linear transducer 374 indexes to the forward or backward operating positions thereby tilting the belt 351 into contact with the oriented fiber strips of appropriate direction. Then the transducer 374 oscillates in short strokes (up to 100 HZ) to propel carriage 353 in the desired direction. One side of the belt is always moving or oscillating in a direction opposite to that of the belt section in the opposite side of housing 350. Therefore, the carriage is driven during both halves of the oscillation albeit by one side of the belt or the other. One side is slipping while the other is driving.

Figure 29F:
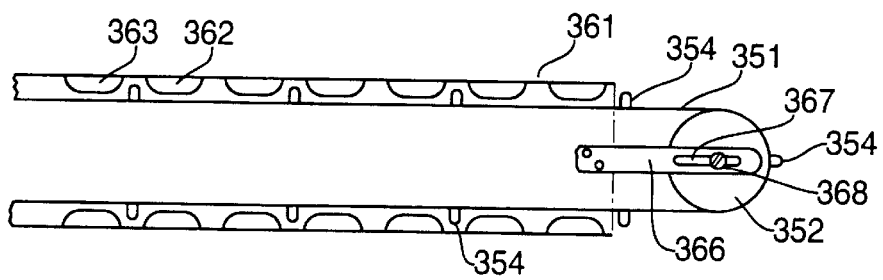

FIG. 29F shows a top view of belt 351 as aligned between bumps 362 and 363. During initial set-up, pulley 352 is moved within slot 367 in bracket 366 to achieve this registration with power off and the transducer 374 in its "home position". In this position, during a power emergency, the curtain can be pulled by hand since there is no engagement of belt 351 (which is not tilted) with carriage 353.

Figure 29G:
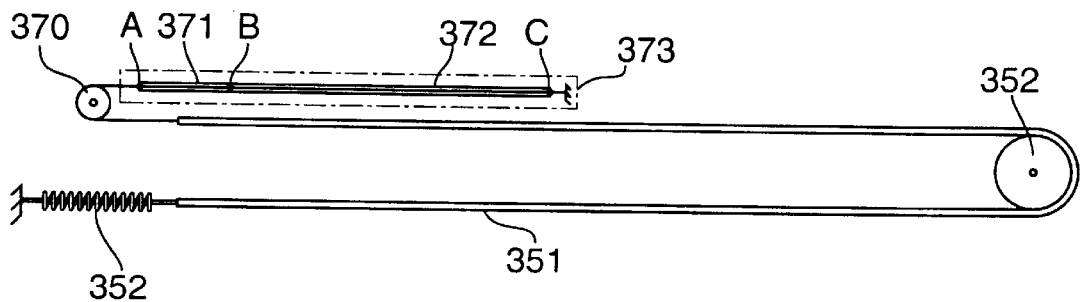

FIG. 29G shows an alternate drive arrangement using either shape memory alloy wires or ribbon, or EAP scrolled rope elements. A pulley 370 is used to guide the drive elements along the side of the track. Element 372, the longer one actuated through contact pair B and C, is used to select direction. The shorter element 371, actuated through contact pair A and B, is oscillated for driving through the desired oriented fiber strips.

Figure 30:
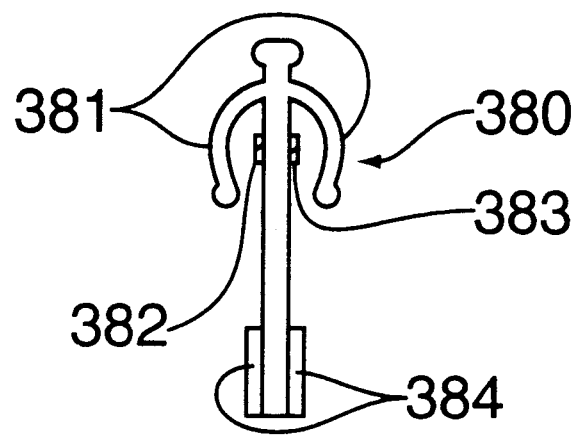
FIG. 30 is an end view of a plastic rib of a piezo curtain puller.

FIG. 30 shows an end view of a plastic rib extrusion 380 with friction pads 384 on each side near the bottom two conductive traces 382 and 383 and safety cover wings 381. This is an alternate embodiment which would be more desirable for very long curtains where the pulsations of the previous embodiment may diminish the farther the puller gets away from the driven end.

Figure 31:
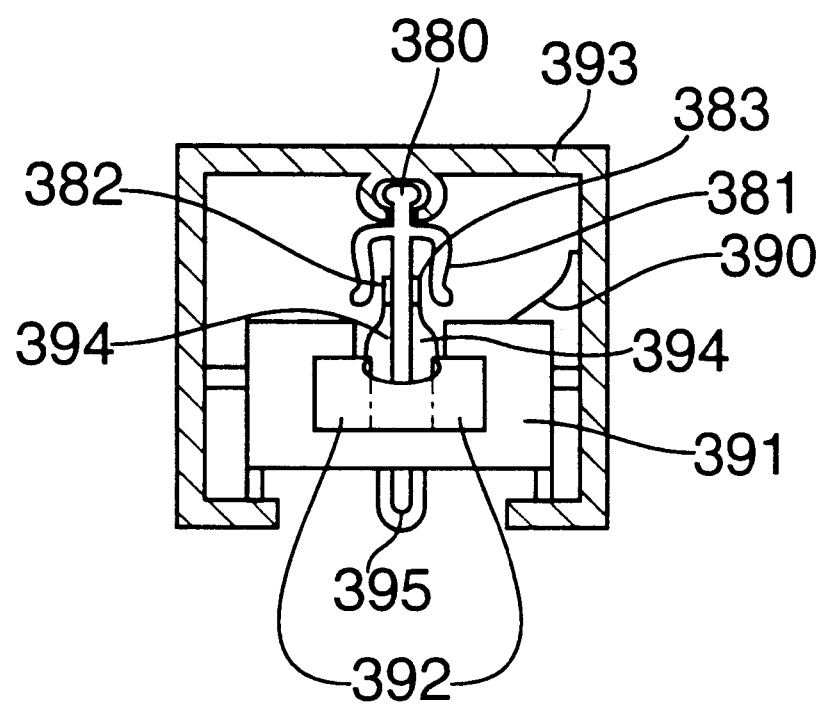
FIG. 31 is an end view (with the track profile in cross section) of a powered curtain puller using two piezo thrusters.

FIG. 31 shows an end view of the puller within the cross section of the rail. The curtain puller is powered by two piezo thrusters 392, one on each side of the rib and interacting with friction pads 392. A common electrical contact or pickup 390 makes contact with the track itself (a third contact on the rib can be used instead). DSES trace 382 powers each DSES section of the two thrusters 392. Motion trace 383 powers both linear elements of the two thrusters 392. The curtain puller can be light and compact due to the nature of piezo thrusters. Only low current is required by the thrusters for a given power since they are high voltage devices. This reduces the cost of the conductors on the rib structure and also reduces the effects of contact resistance. The use of low friction power off type piezo thrusters permit manual operation in case of power failure.

Figure 32:
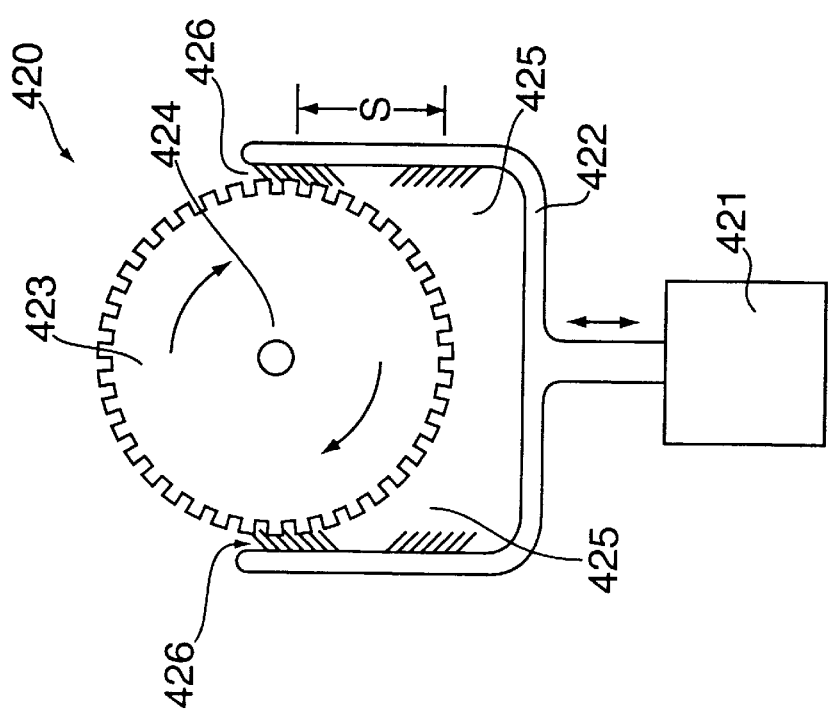
FIG. 32 is a front elevation of a reversible motor using a single transducer.

FIG. 32 shows a reversible rotary motor 420 driven by a single long-stroke oscillatory transducer 421. It has a fluted surface on drum 423 which rotates on axle 424. An oscillating yoke 422 having oriented fiber patch pairs 426 and 425 engages drum 423 at either pair thereby selecting the desired direction. As shown, a clockwise rotation is induced by virtue of oscillating yoke 422 in short strokes around the indicated position. By moving yoke 422 up a distance "S" and then oscillating it in short strokes with fiber pair 425 engaging drum 423, counter-clockwise rotation would result. Rotational speed is a function of the frequency and oscillatory stroke length.

Figure 33:
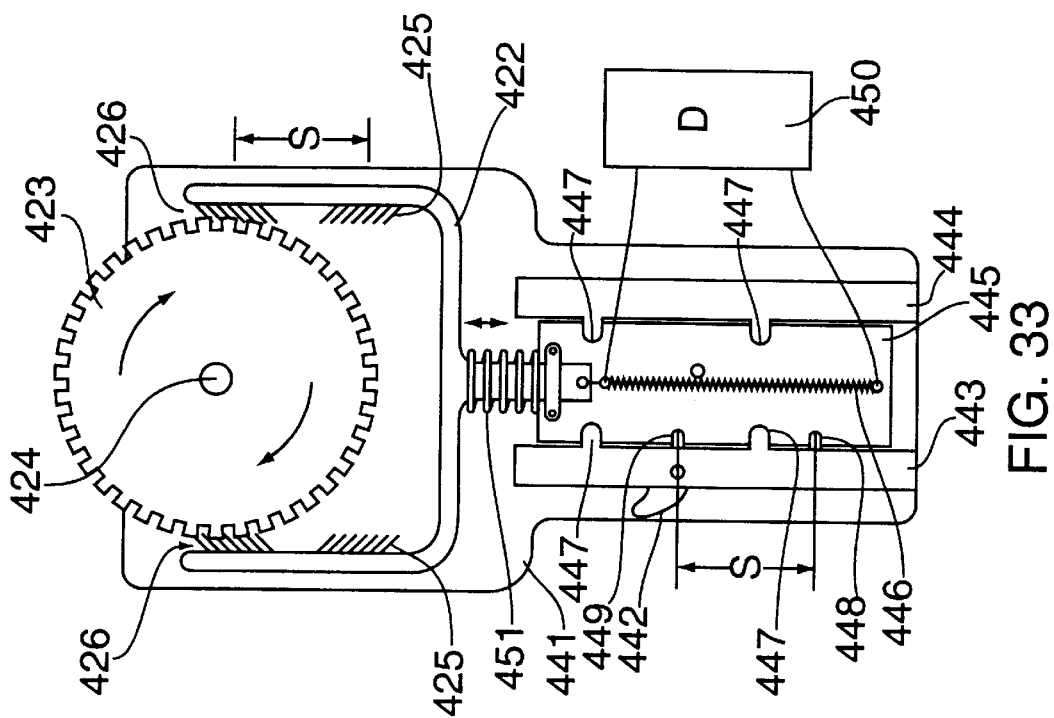
FIG. 33 is a manually reversible motor driven by an EAP or a shape memory element.

FIG. 33 shows a manually reversible rotary motor driven by a length of EAP scrolled rope or NiTi shape memory wire 446 driven by the appropriate driver 450. A return spring 451 puts constant stretching tension on power element 446. A subframe 445 includes a subassembly of yoke 422, element 446 and spring 451. It slides within rails 443 and 444 attached to motor frame 441. Tabs 447 keep subframe 445 from falling out from between rails 443 and 444. Manual latch 442 engages either notch 449 or notch 448 to select either clockwise rotation (as shown) or counter-clockwise rotation respectively. Subframe 445 is manually shifted a distance "S" and locked to change direction.

Figure 34:
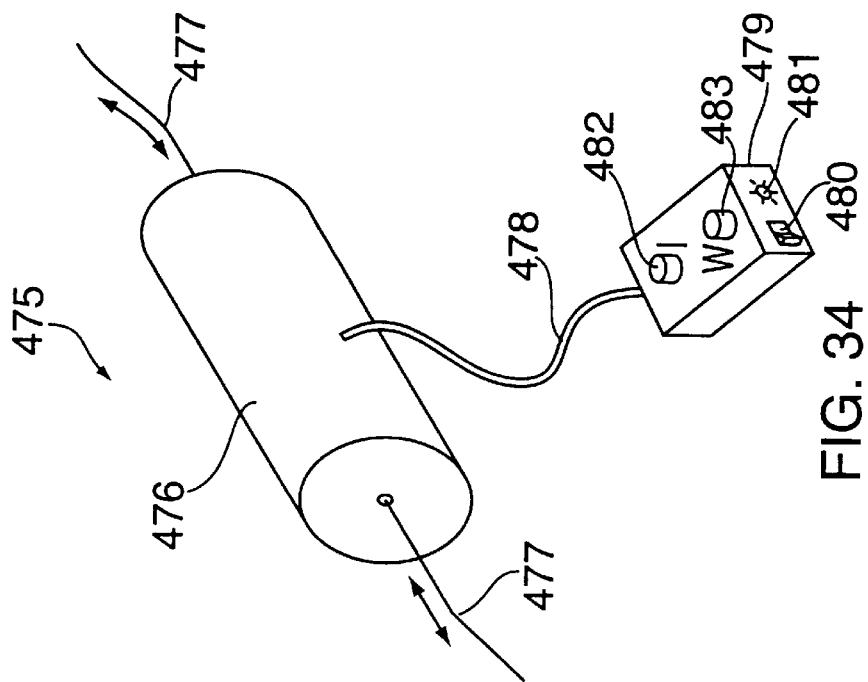
FIG. 34 is a perspective view of an ergonomic catheter driver.

FIG. 34 shows an ergonomic catheter driver 475. It can be appreciated that similar driver head apparatus can be used for other applications as well. In particular, this can be an alternate embodiment to the automotive power antenna of FIG. 9.

A catheter 477 is shown threaded through the housing 476 of the driver 475. A control/power cord 478 leads to the control box 479 with on/off switch 480, indicator 481, "Insert" switch button 482, and "Withdraw" switch button 483.

Figure 35:
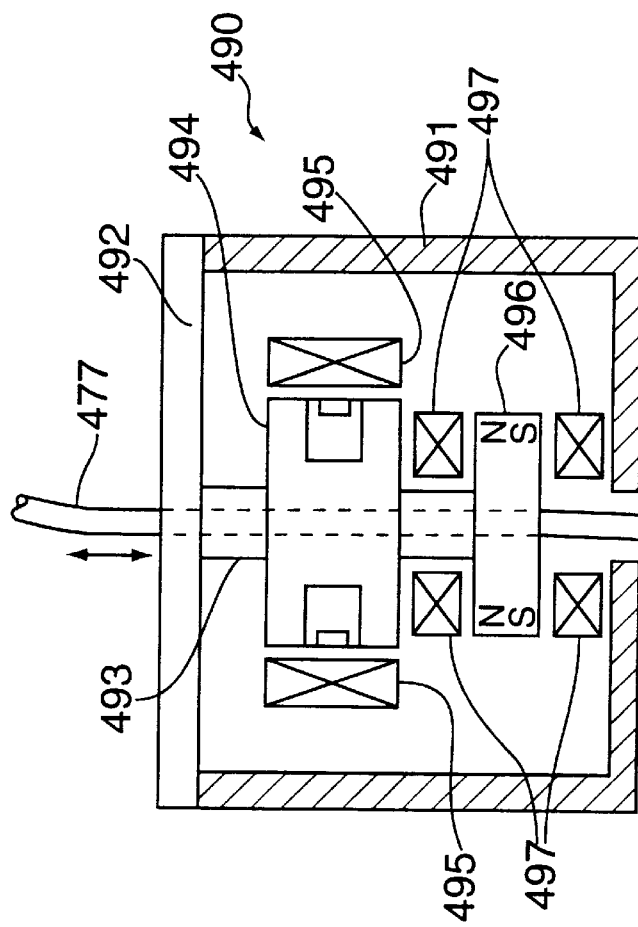
FIG. 35 is a side elevation of catheter driver subassembly with the housing shown in cross section.

FIG. 35 with housing 491 in cross section shows a dual motion oscillating transducer driver 490. Two orthogonal modes of oscillation are torsional driven by the interaction of coil 495 with magnetic structure 494, and linear driven by the interaction of magnet disk 496 interacting with coils 497. A short length of elastomeric tubing 493 with a snug clearance hole for catheter 477 connects assembly 494 to elastomeric disk 492.

Figure 36:
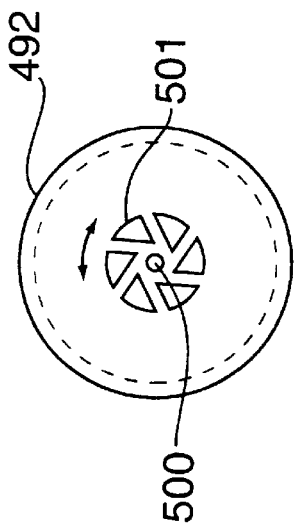
FIG. 36 is a top view of an elastomeric clutch disk.
Figure 37:
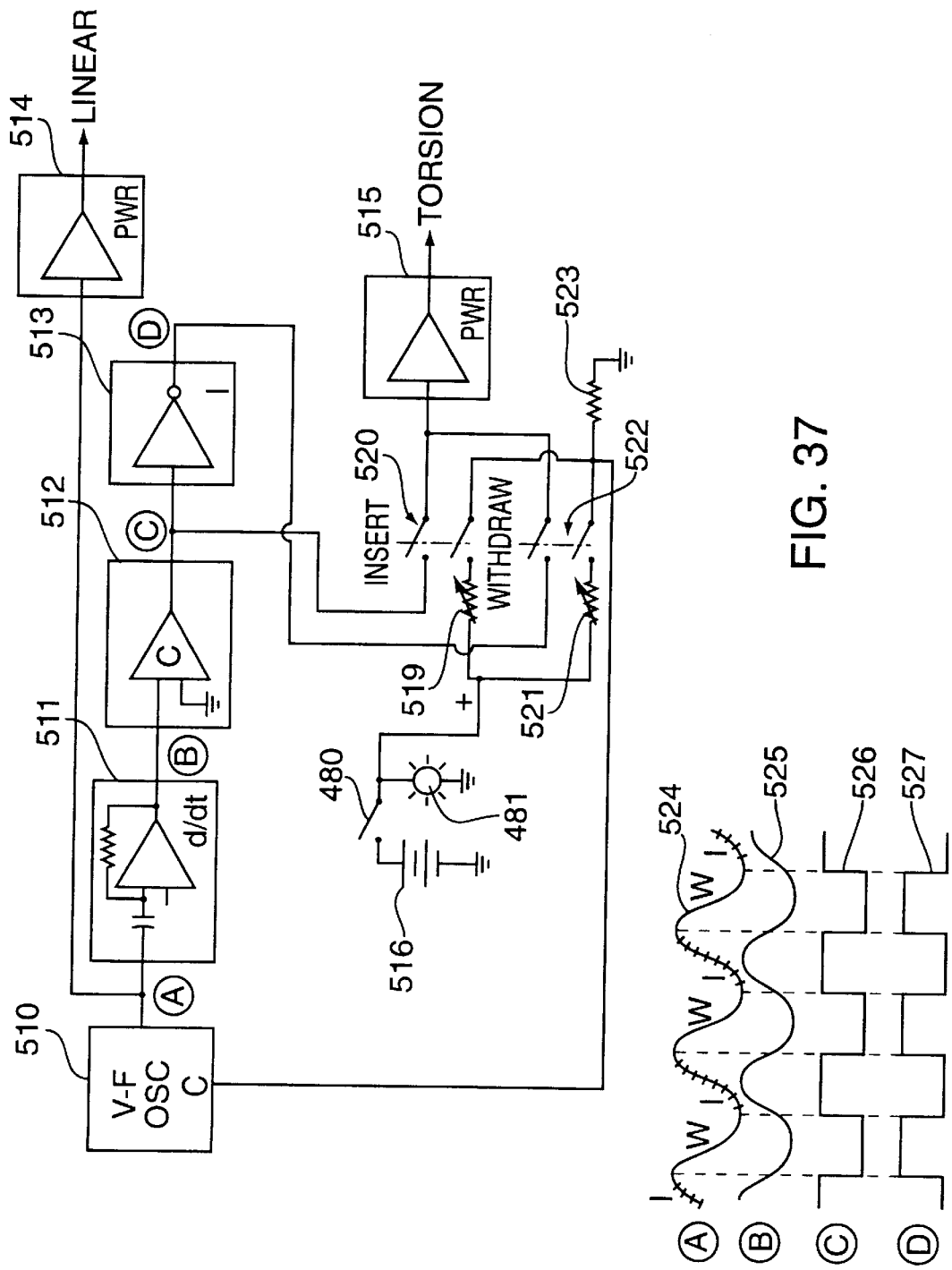
FIG. 37 is a block diagram of a driver electronics for a catheter driver.
Figure 38:
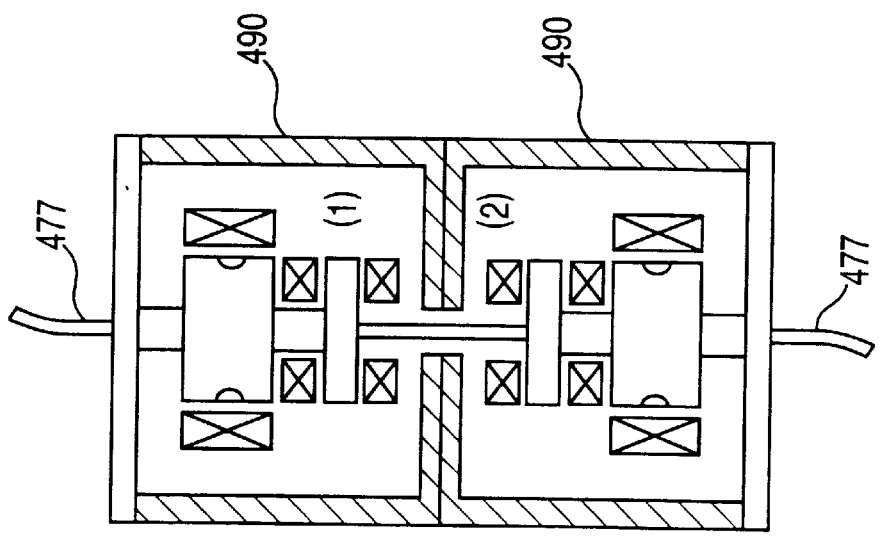
FIG. 38 is a side elevation of a dual driver subassembly with housings shown in cross section.

FIG. 36 is a detail of disk 492 with cutouts 501 and center catheter hole 500. Since the periphery of 492 is attached to housing 491, if the center section is rotated counter-clockwise from a rest position, the disk will distort gripping catheter 477; clockwise releases 477. FIG. 37 is a block diagram of the driver electronics. The linear transducer element just causes disk 492 to flex linearly as required. A voltage-to-frequency oscillator 510 feeds a differentiator stage 511 which shifts the phase by 90 degrees, further feeding a 0-voltage comparator 512 which feeds inverter 513. A battery 516 powers all devices through power switch 480 with indicator 481. The waveforms at various points in the circuit are plotted. Point A produces a sine wave 524 which is used to actuate the linear transducer coil through power amplifier 514. The insert direction is shown on the waveform by hash marks. The output at point B 525 is a cosine wave. The output at C is square wave 526 and its inverse 527 is obtained at D. The torsion transducer is either fed waveform 526 or 527 depending on the desired direction as powered by power amplifier 515. Insert switch 520 is a double pole single throw (DPST) momentary action type mounted so as to mechanically exert pressure on a force sensing resistor 519 as manufactured by Interlink Electronics, Inc. of Camarillo, Calif. This would select waveform 526 to alternately clamp and unclamp catheter 477 such that the clamping periods coincide with "insert" motions. A similar arrangement with force sensing resistor 521, switch 522 will select torsion waveform 527 to cause alignment of clamping periods with "withdraw" segments of the linear waveform 524. As selected by either switch 520 or 522, force sensing resistor 519 or 521 will become part of a voltage divider formed with fixed resistor 523. This voltage is used to set the frequency of oscillator 510 as a function of the force exerted on either switch button. The harder the switch is squeezed, the higher the frequency. With a fixed stroke, the higher the frequency, the higher the insert or withdraw speed. This results in a simple ergonomic control. For smoother operation, two driver assemblies attached back to back are used to power the catheter 477 essentially continuously (i.e.—not in half cycles). This configuration is shown in FIG. 38.

Figure 39:
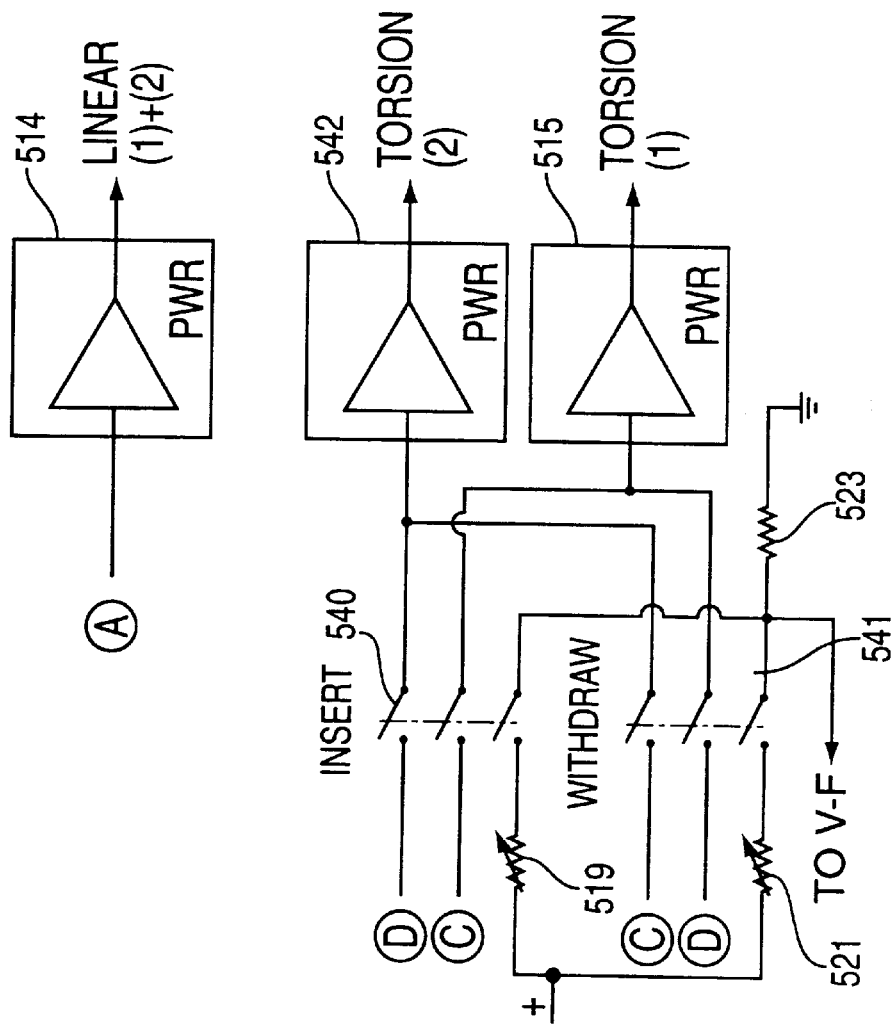
FIG. 39 is a block diagram modification for a dual drive.

With minor changes shown in FIG. 39, both driver 490 sections can be driven by the circuit of FIG. 37. The linear sections of both drivers 490 are driven by power amplifier 514. The two-pole switches 520 and 522 are replaced with 3-pole switches 540 and 541 to select opposite polarity torsional signals for driver (1) and driver (2); therefore a second power amplifier block 542 is added to power torsional signal to driver (2).

Figure 40:
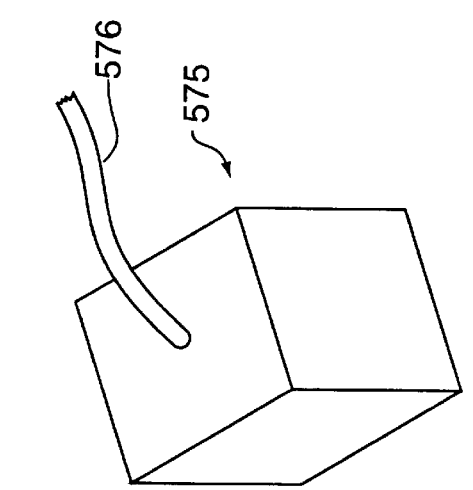
FIG. 40 is a perspective view of a pneumatic autonomous robot element.

FIG. 40 shows a pneumatic autonomous robotic element 575 that can traverse a smooth plane surface and vector in any direction. An umbilical 576 carries compressed air for power and electrical control signals. Unlike the pneumatic robotic elements of U.S. Pat. No. 5,770,913, this embodiment uses constant surface contact of the moving block with a DSES based on the principles of air bearings and vacuum pickers or clutches. Thus the DSES acts as a true dynamic friction coefficient switch by virtue of dynamic gas lubrication control.

Figure 41:
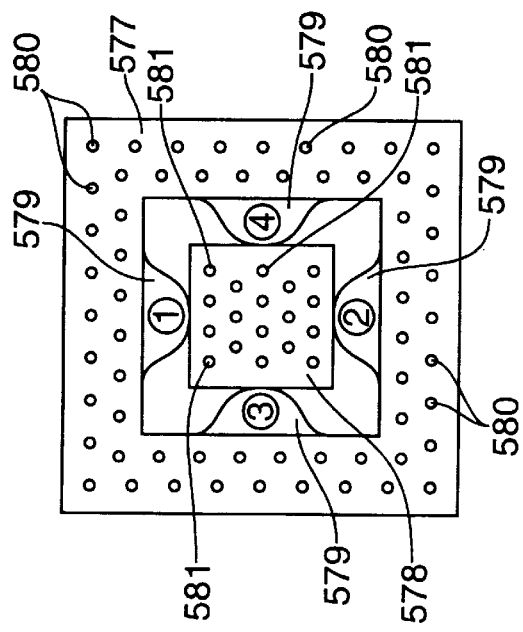
FIG. 41 is a bottom elevation view of a robot element showing pneumatic DSES details; and, FIG. 42 is a pneumatic block diagram of a robot driver.

FIG. 41 shows the bottom of robot 575. Block 578 can be moved in two orthogonal directions by four pneumatic bladders 579 attached to frame 577. They are used in pairs with one of each pair venting while the other is filling with compressed air. Note that both the frame 577 and block 578 have a pattern of small holes 580 and 581. These are the elements that form the air bearings or vacuum suction devices. In this embodiment, both the block and the frame constitute separate DSES elements. It can be appreciated that if the frame DSES and the block DSES are cyclically driven 180 degrees out of phase (pressure/vacuum) while the bladder 579 pairs 1,2 and 3,4 are also controlled at the same frequency (pressure/vent) with phase control, the desired operation can be obtained.

Figure 42:
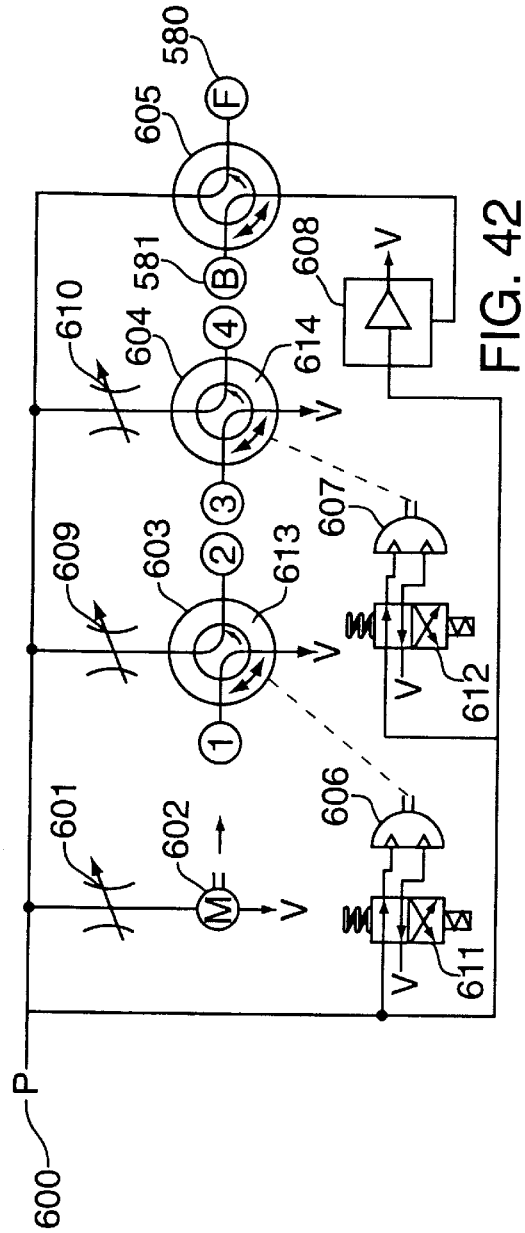

FIG. 42 shows a pneumatic circuit 600 that can be used to drive the robotic element. All components would be carried by the robot to afford higher frequency operation. In this diagram, "v" denotes vent. Pressure enters at P. A small pneumatic rotary motor 602 is powered through pressure regulator 601 which can select motor speed and thereby set system operating frequency. Three rotary valves 603, 604, and 605 are driven synchronously by 602 with valve cores attached to a common shaft. Valve 605 drives the two DSES elements supplying either pressure or vacuum through vacuum generator 608 cyclically to the frame F and the block B. Valve 603 feeds bladders 1 and 2. Valve 604 feeds bladders 3 and 4. The housings of valves 603 and 604 are rotated 90 degrees leading or lagging the housing of rotary valve 605 to select direction of Y or X motion components respectively. The pressure regulators 609 and 610 regulate the ground speed of the Y or X vector of robot 575. Pneumatic rotary actuator 606 as controlled by two position solenoid valve 611 shifts the housing of valve 603. Similarly, actuator 607 controlled by solenoid valve 612 controls the housing shifts of valve 604. All of the control elements can be part of closed loop navigation of the autonomous robotic element.

It is further noted that other modifications may be may to the invention within the scope of the invention, as noted in the appended claims.

We claim:

1. An apparatus for moving an object bi-directionally along constrained paths comprising at least two orthogonal oscillatory transducers cooperatively driving a plurality of intermediary elements moving said object bi-directionally along said constrained paths, wherein said object is an end-use device, such as for example but not limited to, an automotive vehicle power window, and further wherein said oscillatory transducers are fewer than four discrete transducers operated at frequencies well below ultrasonic frequencies using single contact elements in each repetitive contact-and-move drive sequence.

2. The apparatus as in claim 1, wherein said object is a vehicle power window, wherein further said intermediary elements include a pair of leaf springs, each said leaf spring transmitting power from each said transducer to a friction drive block, said friction drive block exerting force against two push-pull drive tapes, each said push-pull drive tape cooperating to move said vehicle power window bi-directionally along said constrained paths.

3. The apparatus according to claim 2 wherein said at least two orthogonal oscillatory transducers comprise two pull solenoids with return springs, said solenoids and said return springs acting to drive said push-pull drive tapes driving said vehicle power window bi-directionally along said constrained paths.

4. The apparatus according to claim 2 wherein said at least two orthogonal oscillatory transducers comprise of two voice coil actuators, said voice coil actuators driving said vehicle power window bi-directionally along said constrained paths.

5. The apparatus according to claim 2 wherein said at least two orthogonal oscillatory transducers comprise two push-pull solenoids cooperating to move said vehicle power window bi-directionally along said constrained paths.

6. The apparatus according to claim 2 wherein said at least two orthogonal oscillatory transducers comprise two subassemblies, wherein each subassembly further includes one or more long-stroke bending piezoelectric transducers.

7. The apparatus according to claim 2, wherein said object is a power window and further wherein said friction drive block comprises a central section with two friction surfaces and an additional two friction surfaces attached to said central section by side springy extensions so as to engage both surfaces of said push-pull drive tapes thereby enhancing the frictional coupling thereof.

8. The apparatus according to claim 1, wherein said intermediary elements comprise a pair of leaf springs in a subassembly with two friction blocks, each said friction block exerting force on respective push-pull drive tapes to move a vehicle power window bi-directionally along said constrained paths, and said pair of orthogonal oscillatory transducers comprising a pull solenoid and a rotary solenoid, said pull solenoid and said rotary solenoid cooperatively driving said intermediate elements for moving said vehicle power window bi-directionally along said constrained paths.

9. The apparatus according to claim 1 wherein said object is at least one windshield wiper arm, said intermediary elements including two leaf springs exerting force against a friction drive shell, said friction drive shell driving a timing belt, said timing belt moving about two timing belt pulleys, said timing belt moving said at least one windshield wiper arm in an oscillatory back and forth pattern about a windshield of a vehicle.

10. The apparatus according to claim 1, wherein said object is at least one windshield wiper arm, wherein further said intermediary elements include a dual gear rack frame housing, a gear therein, two leaf springs, said leaf springs attached to respective short-stroke oscillatory transducers moving said dual gear rack housing interacting with said gear thereby causing said at least one windshield wiper arm to move in a long stroke oscillatory back and forth pattern about a windshield of a vehicle.

11. The apparatus according to claim 10 wherein movement of said windshield wiper arm is synchronized with a second said windshield wiper arm through the use of a common electronic driver driving both said windshield wiper arms.

12. The apparatus according to claim 1, wherein said object is a vehicle power antenna movable within a conductive hollow mast, wherein further said transducers drive intermediary elements including a leaf spring driving a friction pad, said friction pad penetrated by a wire with a distal loop, for moving a push-pull semi-rigid drive cord controlling up and down movement of said vehicle power antenna.

13. The apparatus according to claim 1 wherein said object is a power side view mirror, wherein further said transducers drive said intermediary elements including three spring wires, driving a friction pad about a hemispherical drive surface; said two or more oscillatory transducers comprising three pull solenoids with return springs driving said intermediate elements for moving said power side view mirror orthogonally.

14. The apparatus according to claim 1 wherein said object is a power side view mirror wherein further said intermediary elements include a friction pad moving a hemispherical drive surface; wherein further said two or more oscillatory transducers include at least three segments of a shape memory wire, said at least three segments driving said intermediate elements for moving said power side view mirror orthogonally.

15. The apparatus according to claim 14 wherein two separate entire said mechanisms are used in a single housing to move two separate mirror surfaces independently within said single housing.

16. An apparatus for urging a movable, driven catheter bi-directionally along constrained paths comprising two orthogonal oscillatory transducers cooperatively driving a plurality of intermediary elements moving said catheter along said constrained paths, wherein said intermediary elements include a length of elastomeric tubing, and an elastomeric disk with a central hole; further wherein said orthogonal oscillatory transducers comprise a rotary voice coil element combined with a linear voice coil element in a dual motion transducer, said dual motion transducer moving said catheter through a housing.

17. The apparatus according to claim 16 wherein force sensing resistors detect forces pressing on insert and withdraw switches to control the speed of driving said catheter in either direction in an ergonomic manner.

18. The apparatus according to claim 16 wherein two of said dual motion transducers apparatuses are combined to create a smooth drive of said catheter.

19. An apparatus for moving an object bi-directionally along constrained paths comprising a single oscillatory transducer driving one or more driven members bi-directionally through the use of stroke position selective engagement of one of two oriented fiber strips or strip pairs for moving said object bi-directionally along said constrained paths, wherein said one of two oriented fiber strips or strip pairs are reciprocated while in constant contact with said one or more driven members to urge said driven members in a desired direction under the influence of fiber orientation.

20. The apparatus according to claim 19 wherein said object is a vehicle power window and wherein said driven members are two push-pull tapes and said stroke position selective engagement uses a stationary spreader member interacting with a carrier having two pairs of movable oriented fiber blocks, said carrier being rigidly attached to an output member of said single oscillatory transducer, which said single oscillatory transducer is a long-stroke voice coil linear transducer.

21. The apparatus according to claim 19 wherein said one or more driven members include a single friction ring in constant contact with two push-pull tapes and said stroke position selective engagement uses a stationary spreader bar interacting with a circular carrier having two pairs of oriented fiber blocks, said circular carrier being attached to the output of a bi-directional rotary solenoid for moving said vehicle window bi-directionally along said constrained paths.

22. The apparatus according to claim 19 wherein said one or more driven members is a curtain carrier that pulls or pushes said curtain open or closed, and said stroke position selective engagement of said one of two oriented fiber strips is achieved by the interaction of a belt with two oriented fiber strips tilting in one direction or another within a track housing under the influence of a stationary bump strip attached to the inner sides of the track housing, said single transducer being a long stroke voice coil transducer.

23. The apparatus according to claim 19 wherein said one or more driven members is a curtain carrier that pulls or pushes the curtain open or closed, and said stroke position selective engagement of one of two oriented fiber strips is achieved by the interaction of a belt with two oriented fiber strips tilting in one direction or another within a track housing under the influence of a stationary bump strip attached to the inner sides of the track housing, said single transducer being a series arrangement of a long and a short length of a shape memory ribbon.

24. The apparatus according to claim 19 wherein said one or more driven members is a curtain carrier that pulls or pushes said curtain open or closed, and said stroke position selective engagement of one of two oriented fiber strips is achieved by the interaction of a belt with two oriented fiber strips tilting in one direction or another within a track housing under the influence of a stationary bump strip attached to the inner sides of the track housing, said single transducer being a series arrangement of a long and a short length of scrolled rope electrically active polymer.

25. The apparatus according to claim 19 wherein said object is a bi-directional rotary motor, wherein further said one or more driven members is a drum with a fluted surface, and said stroke position selective engagement of one of two oriented fiber strip pairs is achieved by moving a yoke a fixed linear distance, said single transducer being a long stroke voice coil actuator.

26. The apparatus according to claim 19 wherein said object is a manually reversible rotary motor and wherein further said one or more driven members is a drum with a fluted surface, and said stroke position selective engagement of one of two oriented fiber strip pairs is achieved by manually moving a subframe housing.

27. The apparatus according to claim 26 wherein said single transducer is a length of shape memory wire.

28. The apparatus according to claim 26 wherein said single transducer is a length of scrolled electrically active polymer rope.

29. A thruster mechanism for bi-directional movement of an object, said thruster comprising a thruster moving itself relative to a reaction surface, or to drive a driven member relative to itself, by operating said thruster while a surface of a Dynamic Surface Engagement Switch (DSES) is constantly forced against said reaction surface of said driven member, wherein cyclic operation of said DSES and its coordination with the oscillatory linear movement of said DSES by a linear oscillatory transducer achieves bi-directional motion of said object, wherein said DSES comprises a housing having a plate therein, said plate having surface deformation pins which are cyclically driven past a contact surface through apertures in said contact surface of said DSES, by the action of a dedicated oscillatory transducer moving said plate having said surface deformation pins thereon.

30. The thruster according to claim 29 wherein said linear oscillatory transducer and said dedicated oscillatory transducer are piezoelectric stacks.

31. The thruster according to claim 30 wherein said thruster is operated at ultrasonic frequency.

32. The thruster according to claim 29 wherein said linear oscillatory transducer and said dedicated oscillatory transducer are piezoelectric bending transducers.

33. The thruster as in claim 32 wherein said transducers are THUNDER® devices.

34. The thruster according to claim 33 wherein said thruster is operated at ultrasonic frequency.

35. The thruster according to claim 29 wherein said linear oscillatory transducer and said dedicated oscillatory transducer are pneumatic bladders.

36. The thruster according to claim 29 wherein said object is a curtain moving machine, wherein further said thruster further comprises a track, a curtain carrier powered by one or more piezoelectric thrusters, and a power distribution conductor system along the track housing.

37. A manufacturing method for manufacturing said DSES element of claim 29, wherein said DSES comprises components including said housing having said plate therein, said plate having said surface deformation pins which are cyclically driven past said contact surface through said apertures in said contact surface of said DSES, by the action of said dedicated oscillatory transducer, said transducer moving said plate, said plate having said surface deformation pins thereon, said method comprising the steps of:
assembling all of said components of said DSES element;
selectively statically powering said dedicated oscillatory transducer;
simultaneously grinding both a contact surface of said DSES flat and a plurality of protruding pins protruding through said contact surface flat, and then,
lapping said contact surface into a smooth low friction planar surface.

38. An apparatus for moving a vehicle power window bi-directionally along constrained paths comprising a pair of pressure pads, each said pressure pad providing a low friction surface against one or the other of a pair of non-perforated push-pull drive tapes, said pressure pads being spring loaded by a pair of springs, and a friction wheel resisting the forces by said pressure pads, said friction wheel being driven in either direction by a gear motor.

39. A pneumatically driven autonomous robot element comprising dual pneumatic DSES elements including planar contact surfaces with an array of apertures which are cyclically switched form a source of compressed air, which acts as a lubricant to greatly reduce surface friction, to a vacuum source, which acts as a clamping medium increasing contact frictional force, wherein two orthogonal bladder pairs are cyclically pressurized or vented to move a central block, with pneumatic DSES relative to a surrounding frame with pneumatic DSES, wherein all cyclic activity is oscillated at the same frequency, and coordination of phase differences relative to the DSES cycles determines the path of said robotic element which can vector anywhere on a smooth planar surface, wherein two said DSES elements are driven in synchronism but 180 degrees out of phase such that the frame is in a vacuum when said central block is expelling air, and vice-versa.

* * * * *